US007710578B2

(12) United States Patent
Sändig et al.

(10) Patent No.: US 7,710,578 B2
(45) Date of Patent: May 4, 2010

(54) POSITION MEASURING ARRANGEMENT

(75) Inventors: Karsten Sändig, Palling (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 413 days.

(21) Appl. No.: 11/900,268

(22) Filed: Sep. 11, 2007

(65) Prior Publication Data
US 2008/0062432 A1    Mar. 13, 2008

(30) Foreign Application Priority Data
Sep. 12, 2006    (DE) .................. 10 2006 042 743

(51) Int. Cl.
G01B 11/02    (2006.01)
(52) U.S. Cl. ..................................... 356/499
(58) Field of Classification Search ................. 356/494, 356/499, 521; 250/237 G
See application file for complete search history.

(56) References Cited

U.S. PATENT DOCUMENTS

| 4,776,701 | A |   | 10/1988 | Pettigrew |
| 5,079,418 | A |   | 1/1992 | Michel et al. |
| 5,104,225 | A |   | 4/1992 | Masreliez |
| 5,430,546 | A |   | 7/1995 | Huber |
| 5,497,226 | A |   | 3/1996 | Sullivan |
| 5,666,196 | A | * | 9/1997 | Ishii et al. ................ 356/499 |
| 5,742,391 | A | * | 4/1998 | Kaneda et al. ........... 356/499 |
| 7,019,842 | B2 |  | 3/2006 | Holzapfel et al. |
| 7,126,696 | B2 | * | 10/2006 | Tobiason .................. 356/499 |
| 7,214,928 | B2 |  | 5/2007 | Mayer et al. |
| 2004/0051881 | A1 |  | 3/2004 | Holzapfel et al. |
| 2006/0139654 | A1 |  | 6/2006 | Takahashi et al. |
| 2007/0013920 | A1 |  | 1/2007 | Holzapfel |

FOREIGN PATENT DOCUMENTS

| DE | 42 01 511 A1 | 7/1992 |
| DE | 100 22 619 A1 | 12/2001 |
| DE | 102005029 917 A1 | 1/2007 |
| EP | 0 163 362 B1 | 6/1988 |
| EP | 0 387 520 A2 | 2/1990 |
| EP | 0 446 691 B1 | 7/1994 |
| EP | 1 674 834 A2 | 6/2006 |
| WO | WO 02/23131 A1 | 3/2002 |

* cited by examiner

Primary Examiner—Michael A Lyons
(74) Attorney, Agent, or Firm—Brinks Hofer Gilson & Lione

(57) ABSTRACT

A position measuring arrangement for detecting a relative position is disclosed. The position measuring arrangement includes a reflection scale graduation and a scanning unit having a plurality of optical elements. The plurality of optical elements includes a combining grating, a retro-reflector element, a scanning grating and detector elements. The optical elements are arranged so that light beams and/or partial light beams of a scanning beam path act on the reflection scale graduation at least twice; a directional reversal of the incident partial light beams impinging on the reflection scale graduation perpendicularly with respect to the measuring direction takes place by the retro-reflector element; and a pair of partial light beams impinges in a non-parallel manner on the combining grating, and the combining grating brings the partial light beams impinging on the combining grating to interference, so that phase-shifted signals are detected by the plurality of detector elements.

25 Claims, 24 Drawing Sheets

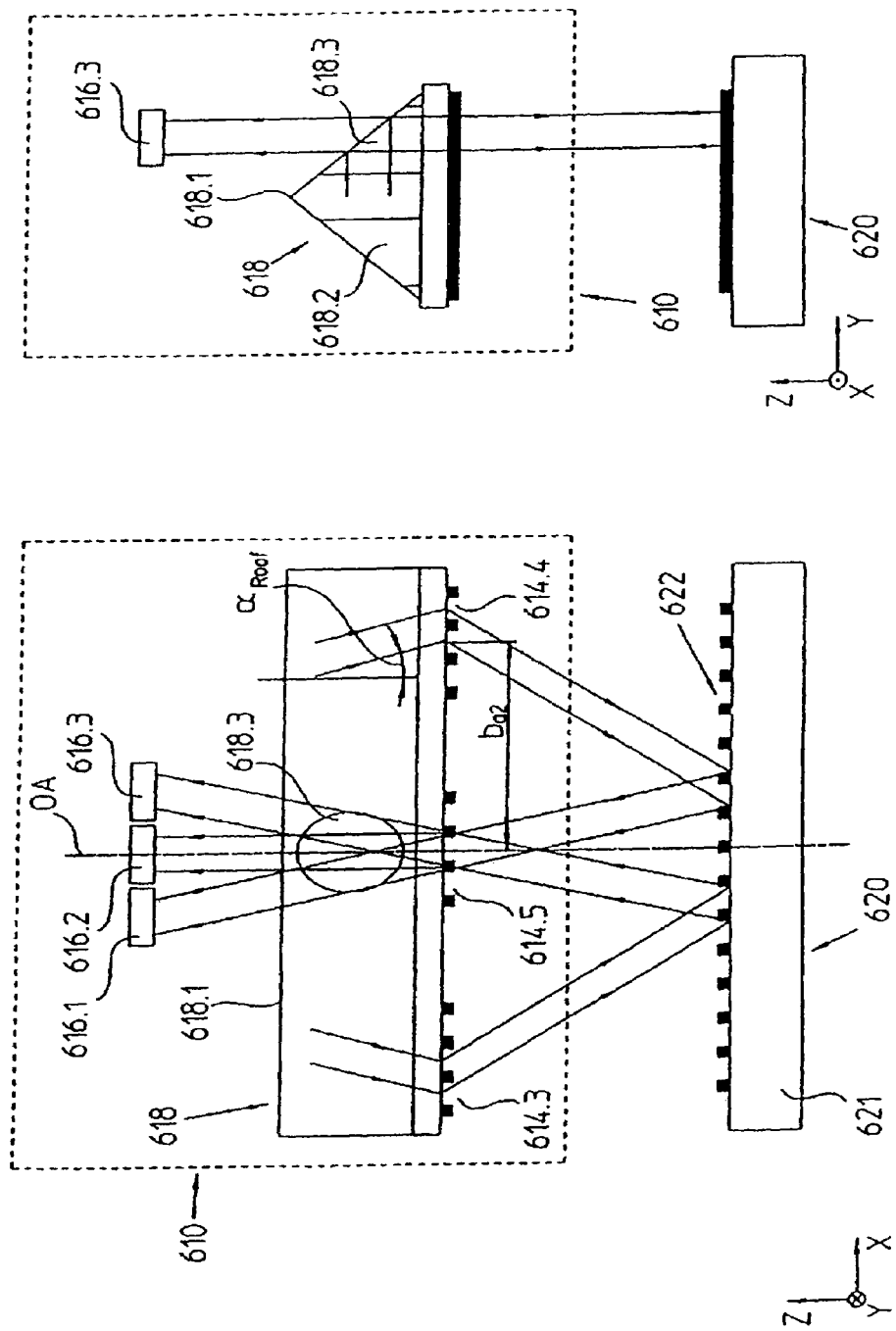

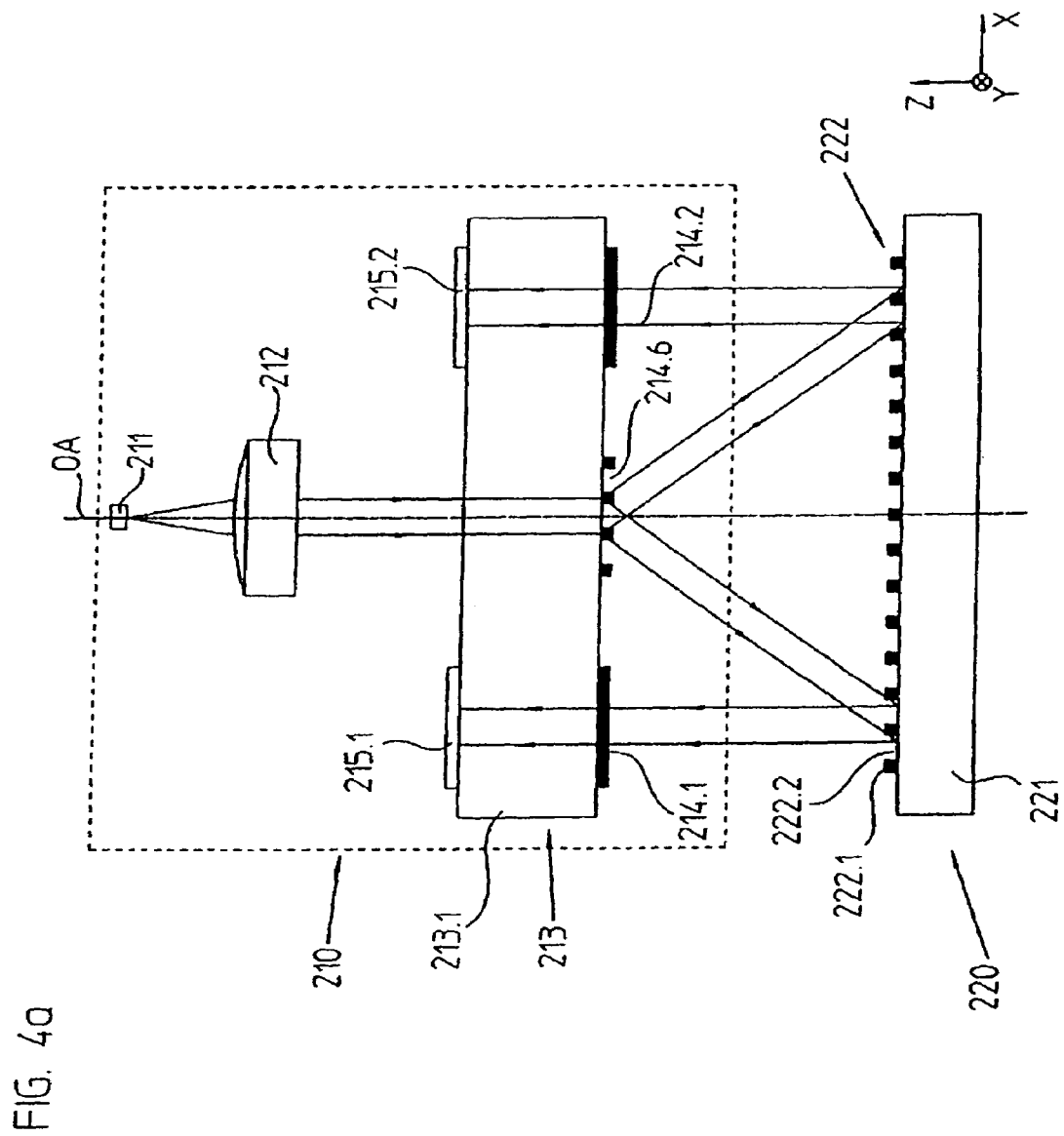

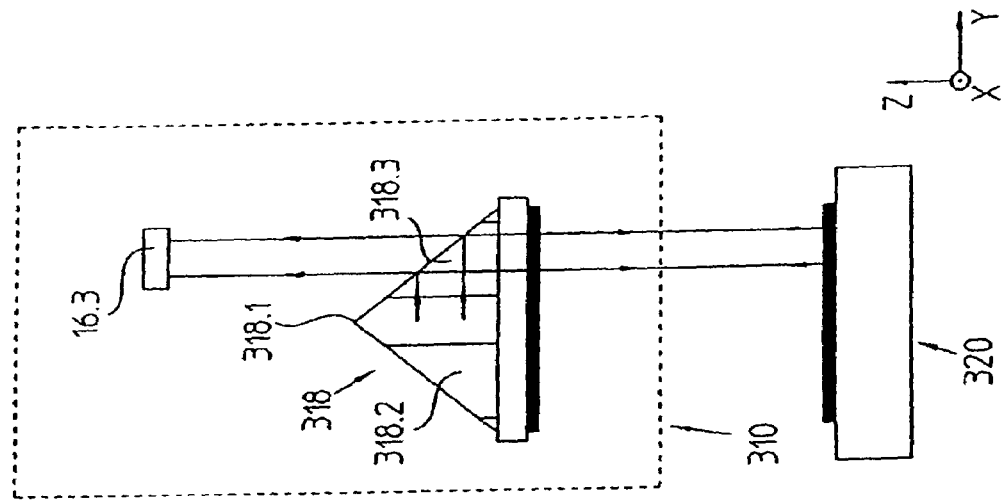
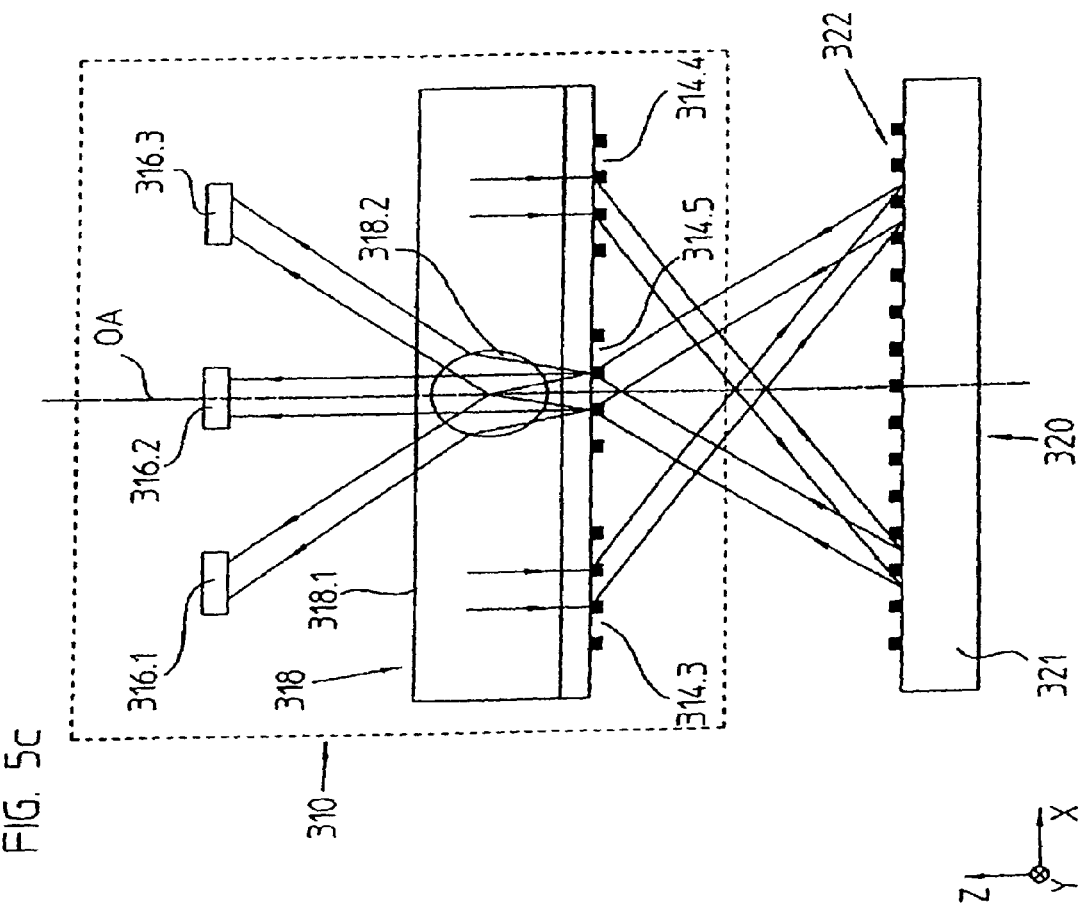

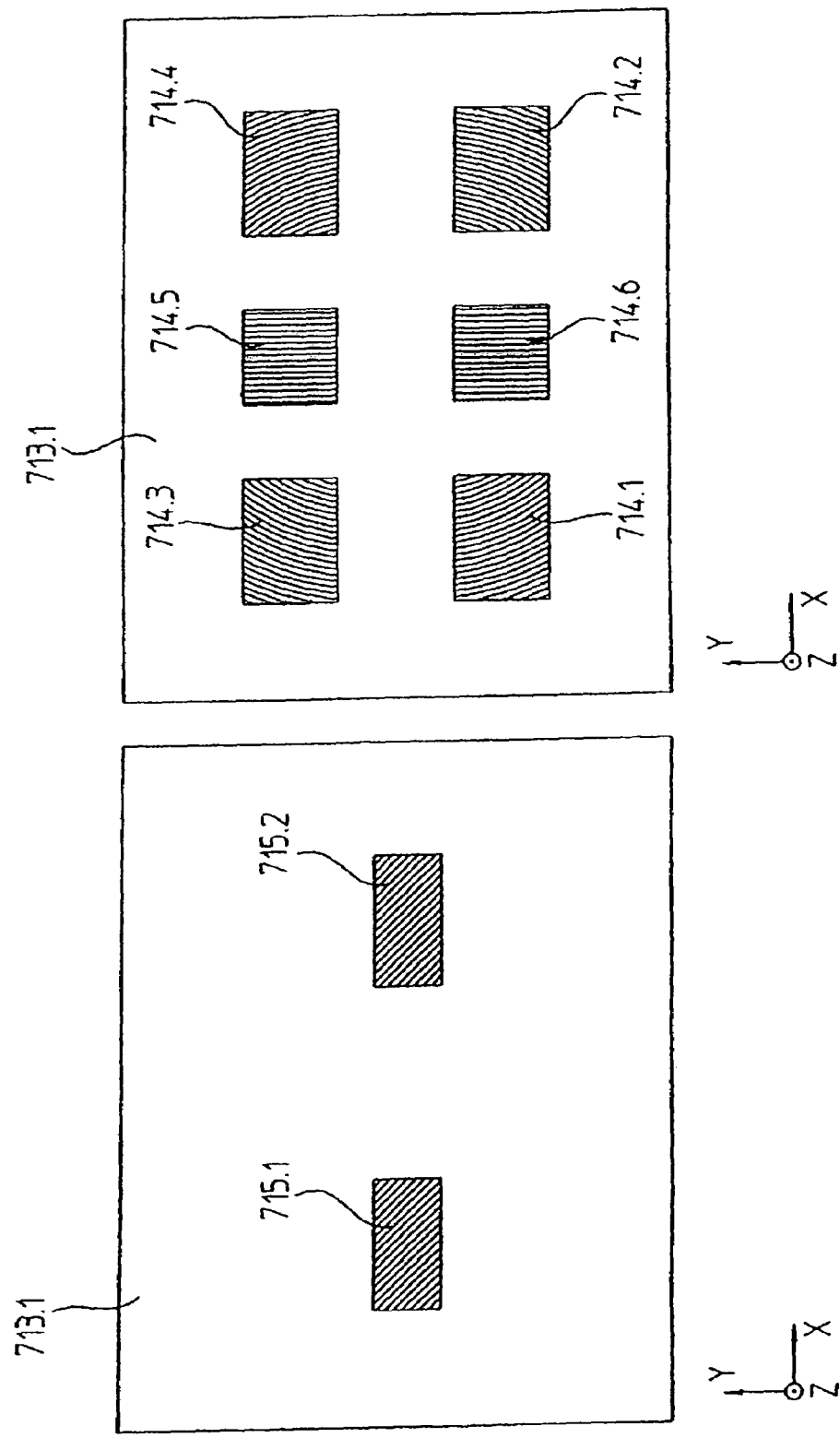

POSITION MEASURING ARRANGEMENT

Applicants claim, under 35 U.S.C. §119, the benefit of priority of the filing date of Sep. 12, 2006 of a German patent application, copy attached, Serial Number 10 2006 042 743.2, filed on the aforementioned date, the entire contents of which is incorporated herein by reference.

BACKGROUND OF THE INVENTION

1. Field of the Invention

The present invention relates to a position measuring arrangement for detecting the relative position of a scanning unit, as well as to a reflection scale graduation, which can be moved in relation to the latter in at least one measuring direction, wherein the scanning unit includes a plurality of optical elements.

2. Discussion of Related Art

A high-resolution optical position-measuring arrangement is known from WO 02/23131 A1 and U.S. Pat. No. 7,019,842, the entire contents of which are incorporated herein by reference. Besides a reflection scale graduation embodied, for example, as a linear incident light scale, it includes a scanning unit, which can be displaced relative to it in at least one measuring direction. Besides a scanning grating and several optoelectronic detector elements, at least one optical deflection or reflector element in the form of a retro-reflector is arranged on the part of the scanning unit. A back-reflection of the partial light beams initially reflected at the reflection scale graduation in the direction of the reflection scale graduation takes place by the reflector element. There, the partial light beams are subsequently reflected a second time before interfering partial light beams then finally reach the detectors and there generate scanning signals, which are modulated as a function of their displacement. The reflector element of the position measuring arrangement in accordance with the species is designed as a ridge prism, having an optical retro-reflector functionality, and with a ridge has been aligned parallel with respect to the measuring direction. Here, the ridge prism acts as a retro-reflector in a direction which is aligned perpendicularly with respect to the measuring direction x. For creating phase-shifted scanning signals, optical polarization retardation elements in the form of small λ/4 plates are arranged in the scanning beam paths, as well as polarizers in front of the detector elements. However, such optical polarization elements basically increase the complexity, and therefore also the cost, of correspondingly constructed position measuring arrangements.

A further optical position measuring arrangement, in which a double action on the reflection scale graduation results with the aid of a retro-reflector element, is known from EP 0 387 520 A2 and U.S. Pat. No. 5,079,418, the entire contents of which are incorporated herein by reference. In connection with this scanning configuration it is required that the partial light beams impinge slanted in the line direction on the reflection scale graduation. Because of this, relatively close tolerances regarding the scanning distance result in this position measuring arrangement.

Furthermore, reference is made to DE 42 01 511 A1 and U.S. Pat. No. 5,104,225, the entire contents of which are incorporated herein by reference, in connection with such position measuring arrangements. The position measuring arrangement known from this also requires optical polarization components in the scanning beam path. It is therefore necessary to take the different diffraction efficiencies for the two polarization axes into consideration. Since the ratio of efficiency of these diffractions can greatly fluctuate over the scale graduation, it is therefore proposed in DE 42 01 511 A1 to insert two additional small λ/2 plates into the scanning beam paths. This again results in a considerable increase in the outlay, or the costs, of such systems. Furthermore, a signal improvement in this way is only possible if during both reflections the light beams are diffracted at the scale graduation with identical diffraction efficiencies for both polarization axes. However, this is not the case in actuality, since it is necessary to provide an offset of the light beams between the first reflection and the second reflection, and different diffraction conditions exist at the two reflection locations.

OBJECTS AND SUMMARY OF THE INVENTION

It is an object of the present invention to provide an optical position measuring arrangement which makes possible the generation of phase-shifted scanning signals without the employment of optical polarization components. Moreover, the position measuring arrangement should be as tolerant as possible to possible fluctuation to error in the scanning distance.

In accordance with the invention, this object is attained by a position measuring arrangement for detecting a relative position of a scanning unit and a reflection scale graduation which is moved in relation to the scanning unit in a measuring direction. The position measuring arrangement includes a reflection scale graduation and a scanning unit having a plurality of optical elements. The optical elements include a combining grating, a retro-reflector element, a scanning grating and a plurality of detector elements. The plurality of optical elements are arranged so that:

1) light beams and/or partial light beams of a scanning beam path act on the reflection scale graduation at least twice, and in the course of this a plane is defined on the one hand by incident light beams and/or partial light beams that impinge on the reflection scale graduation, and on the other hand by reflected partial light beams that reflect off of the reflection scale graduation, wherein the plane is oriented perpendicularly to a graduation plane defined by the reflection scale graduation, 2) a directional reversal of the incident partial light beams impinging on the reflection scale graduation perpendicularly with respect to the measuring direction takes place by the retro-reflector element; and 3) a pair of partial light beams impinges in a non-parallel manner on the combining grating, and the combining grating brings the partial light beams impinging on the combining grating to interference, so that phase-shifted signals are detected by the plurality of detector elements.

The position measuring arrangement in accordance with the present invention for detecting the relative position of a scanning unit, as well as a reflection scale graduation which can be moved with respect thereto in at least one measuring direction, has several optical elements on the part of the scanning unit, namely at least one retro-reflector element, at least one combining grating, at least one scanning grating, as well as several detector elements. The optical elements in the scanning unit have been preferably arranged in such a way that:

by the retro-reflector element a reversal of direction of the impinging partial light beams toward the reflection scale graduation takes place perpendicularly with respect to the measuring direction (x), and a pair of partial light beams impinges on the combining grating in a non-parallel manner, and the combining grating brings the partial light beams impinging thereon to interference, so that the detector elements detect phase-shifted signals.

The pair of partial light beams preferably impinges on the combining grating symmetrically at identical angles with respect to the optical axis.

In a possible embodiment, the combining grating is designed as a transmission grating and has a graduation period in such a way that it is assured that a deflection of the impinging partial light beams into several co-linearly outgoing orders of diffraction takes place, which act on subsequently arranged detector elements.

In this case the combining grating has preferably been embodied in such a way that by a deflection of the impinging partial light beams takes place in such a way that one of the co-linearly outgoing orders of diffraction is propagated perpendicularly with respect to the graduation plane.

The combining grating can furthermore be embodied as a phase grating, in which the strip thickness and strip width are dimensioned in such a way that three signals, phase-shifted by 120°, can be detected on the downstream arranged detector elements.

In a possible embodiment, the combining grating and the detector elements are embodied as a structured detector arrangement.

The combining grating can be embodied as a location-dependent deflection grating.

Moreover, the scanning unit can include several scanning gratings, as well as at least one combining grating, wherein these are arranged mirror-symmetrically and wherein the plane of symmetry is oriented perpendicularly with respect to the measuring direction and parallel with respect to the optical axis.

In a possible variation, the scanning unit can be arranged as a reflector element, which is embodied as a ridge prism, whose ridge is oriented parallel with respect to the measuring direction.

Alternatively, the retro-reflector element in the scanning unit can include several combined deflection/lens elements, as well as at least one flat reflector element, wherein the focal plane of the lens elements is located in the plane of the at least one flat reflector element.

In this case the lens elements can be designed as diffractive lens elements, the deflection elements as scanning gratings, and together they can be embodied as combined, diffractive grating-lens elements.

In such a variation the lens elements can be embodied as diffractive lens elements in the form of cylinder lenses, which have a focusing effect in the line direction of the reflection scale graduation.

It is furthermore possible to design the lens elements as diffractive lens elements in the form of cylinder-symmetrical lens elements, which have a focusing effect in the line direction of the reflection scale graduation, as well as in the measuring direction.

In a further variation, the retro-reflector element can include a plan-parallel support substrate, on whose side facing the reflection scale graduation several gratings have been arranged, and on whose side facing away from the reflection scale graduation the at least one flat reflector element is arranged.

In a possible embodiment, the impact locations of the two partial light beams can advantageously meet at the combining grating.

Furthermore, the at least one retro-reflector element can be embodied as a monolithic unit on a support element.

In a further embodiment, the scanning unit includes several scanning gratings, as well as at least one combining grating, wherein these are arranged mirror-symmetrically and the plane of symmetry is oriented parallel with respect to the measuring direction and parallel with respect to the optical axis.

In such a variation of the position measuring arrangement in accordance with the present invention, the scanning unit is embodied in such a way that the light beams emitted by a light source, following collimation by an optical collimation device, impinge for a first time on the reflection scale graduation, where splitting into two partial light beams, which correspond to two different orders of diffraction and are reflected back to the scanning unit, takes place, the two back-reflected partial light beams undergo a back reflection in the scanning unit via the retro-reflector element in the direction of the reflection scale graduation, wherein each of the partial light beams passes twice through the scanning grating, the partial light beams impinging a second time on the reflection scale graduation undergo another diffraction and back reflection in the direction toward the scanning unit, in the scanning unit at least one pair of back-reflected partial light beams impinges at symmetrical angles in relation to the optical axis at the same location on the combining grating.

In a further variation of the position measuring arrangement in accordance with the present invention, the scanning unit is embodied in such a way that the light beams emitted by a light source, following collimation by an optical collimation device, are split into at least two partial light beams, which correspond to two different orders of diffraction, by a splitting grating in the scanning unit, and these partial light beams are propagated in the direction toward the reflection scale graduation, then the partial light beams impinge for a first time on different locations on the reflection scale graduation, where respectively a split into several partial light beams, which are reflected back to the scanning unit and correspond to different orders of diffraction, takes place, the at least two back-reflected partial light beams undergo a back reflection in the scanning unit via the retro-reflector element in the direction toward the reflection scale graduation, and wherein each of the partial light beams passes twice through a scanning grating, the partial light beams, which impinge a second time at different locations on the reflection scale graduation, undergo another diffraction and back-reflection in the direction toward the scanning unit, in the scanning unit at least one pair of back-reflected partial light beams impinges at symmetrical angles in regard to the optical axis at the same location on the combining grating.

Here, the scanning gratings in the scanning unit can be embodied as Fresnel cylinder lenses, whose focal lines are located in the plane of the reflector elements, and the graduation period of the splitting grating can be selected to be identical to the graduation period of the combining grating and to the graduation period of the reflection scale graduation.

Moreover, the graduation period of the reflection scale graduation can here be selected to be such that the partial light beams back-reflected in the direction toward the scanning unit cross prior to their first impact on a scanning grating.

Moreover, the graduation period of the reflection scale graduation is preferably selected to be less than the wavelength of the light source used.

Furthermore, the at least one retro-reflector element can be embodied as a combined deflection/lens element.

In a further variation of the position measuring arrangement in accordance with the present invention, the scanning unit is embodied in such a way that the light beams emitted by a light source, following collimation by an optical collimation device, are split into at least two partial light beams by a splitting grating, the two partial light beams then reach an auxiliary splitting grating, by which a deflection of at least a part of the partial light beams takes place in such a way that the partial light beams propagated in the direction toward the reflection scale graduation impinge on the reflection scale graduation at the same location, and the partial light beams impinging on the reflection scale graduation are respectively split into several partial light beams, which correspond to different orders of diffraction and are reflected back to the scanning unit, the at least two back-reflected partial light beams undergo a back reflection in the scanning unit by the retro-reflector element, wherein each of the partial light beams pass twice through a scanning grating, the partial light beams, which impinge a second time at the same location on the reflection scale graduation, undergo another diffraction and back-reflection in the direction toward the scanning unit, in the scanning unit at least one pair of back-reflected partial light beams impinges at different locations on an auxiliary combining grating, where another diffraction and splitting takes place, so that at least two further propagated partial light beams impinge at symmetrical angles in regard to the optical axis at the same location on the combining grating.

In another variation of the position measuring arrangement in accordance with the present invention, the scanning unit is embodied in such a way that the light beams emitted by a light source, following collimation by an optical collimation device, impinge a first time on the reflection scale graduation, which is designed as an incident light refraction grating, where splitting into two partial light beams, which correspond to two different orders of diffraction and are reflected back to the scanning unit, takes place, in the scanning unit the two back-reflected partial light beams undergo a back-reflection in the direction toward the reflection scale graduation via the reflector element, wherein the partial light beams each respectively pass twice through a scanning grating, and in the course of the first passage through the scanning gratings a point focusing of the partial light beams onto the same impact location on a flat reflector element results, the partial light beams impinging a second time on the reflection scale graduation undergo another diffraction and back reflection in the direction toward the scanning unit, in the scanning unit at least one pair of back-reflected partial light beams impinges at symmetrical angles in regard to the optical axis at the same location on the combining grating.

Further details and advantages of the present invention will be explained by the following description of exemplary embodiments in the drawing figures.

BRIEF DESCRIPTION OF THE DRAWINGS

FIG. 1b represents a second portion of a scanning beam path of the position measuring arrangement of FIG. 1a;

FIG. 2c represents a second portion of the scanning beam path of the position measuring arrangement of FIG. 2a in accordance with the present invention;

FIG. 2d shows the portion of the scanning beam path in FIG. 2c in another view;

FIG. 4a represents a first portion of a scanning beam path of a first variation of the second embodiment of the position measuring arrangement of FIGS. 3a-d in accordance with the present invention;

FIG. 5c represents a second portion of the scanning beam path of the position measuring arrangement of FIG. 5a in accordance with the present invention;

FIG. 5d shows a portion of the scanning beam path in FIG. 5c in another view;

FIGS. 8c and 8d respectively show a plan view of a top and underside of an eighth embodiment of a scanning plate to be used with the position measuring arrangement of FIG. 8a in accordance with the present invention.

DETAILED DESCRIPTION OF THE PREFERRED EMBODIMENTS

Figure 1A:
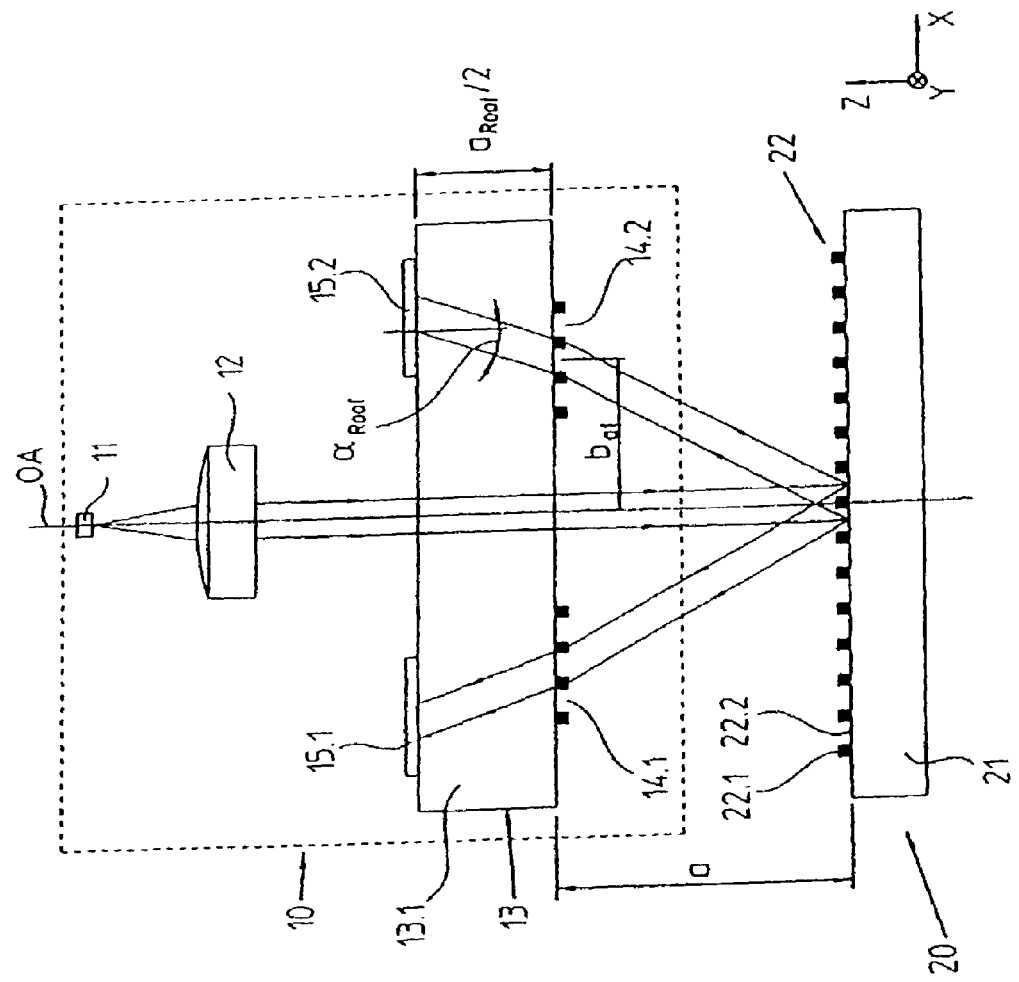
FIG. 1a represents a first portion of a scanning beam path of a first embodiment of a position measuring arrangement in accordance with the present invention.

The above mentioned problems can be solved by the embodiments of the position measuring arrangement described in detail in what follows. Prior to describing the individual examples in detail by the drawing figures, the commonalties of the variations below will be explained.

The various embodiments are each based on a similar scanning beam path. A collimated light beam from a suitable laser light source impinges perpendicularly on a reflection scale graduation, viewed in the line direction (=y-direction). This means that all light beams impinging on the reflection scale graduation and reflected by it are oriented perpendicularly with respect to the line direction and are therefore located in a plane defined by the measuring direction and the normal line on the reflection scale graduation. Depending on the embodiment, it can be provided that the collimated light beam is deflected, or split, before this, which can take place by one or two splitting gratings in the beam path. However, it is also possible that no such deflection, or splitting, takes place.

A reflection, splitting and back-reflection of the impinging light beam(s) into respectively at least two partial light beams (of the +/−1st order of deflection) takes place at the reflection scale graduation. Then these, respectively separated from the incoming partial light beam, impinge in the measuring direction x on separate scanning gratings in the scanning unit. These scanning gratings, downstream arranged reflector elements, or possibly additional 90° or triple prisms, cause a reversal in direction of the transversal beam angle (i.e. a transversal retro-reflection), and compensate in this way for a transversal beam deflection, which causes errors, in case of a possible Moiré-tilting of the scale graduation (so-called optical Moiré compensation). Otherwise these would result in a discernible breakdown in the signal modulation degree. In this connection, Moiré tilting is to be understood as tilting of the reflection scale graduation and of the scanning unit around an axis oriented perpendicularly on the reflection scale graduation.

As a result, the partial light beams undergo a retro-reflection back to the reflection scale graduation, where they are diffracted again. Here, the grating constants, or graduation periods, have been selected in such a way that, following the second diffraction at the reflection scale graduation, the outgoing partial light beams impinge at a symmetrical angle on a combining grating in the scanning unit, and are brought to interference there. To this end, the combining grating has a graduation period, which has been selected such that respectively one of the first orders of diffraction of the impinging partial light beams is further propagated in the direction of the optical axis. In the process, the respective light beams of the resultant zero and +/−1st orders of diffraction outgoing at the combining grating are superimposed on each other and interfere with each other. The structure of the combining grating, i.e. its phase depth, strip width, and possibly the arrangement of several strips per period (superstructure), is selected in such a way that a defined phase shift between the outgoing partial light beams is created, which is preferably selected to be 120°. Alternatively, the combining grating can also be laid out in such a way that both partial light beams in the resultant orders of diffraction are superimposed, and the resulting +/−1st and +/−2nd orders of diffraction are detected. In this case, the layout of the structure of the combining grating is such that four signals, respectively displaced by approximately 90°, in the four detected orders of diffraction are created. The phase-shifted signals are amplified in a downstream located electronic device and are converted in a known manner into offset-free 0° and 90° signals.

Alternatively, the combining grating can also be designed as a so-called location-dependent deflection grating. It is moreover possible to combine the combining grating and the detector elements in a unit in the form of a so-called structured detector arrangement.

The creation of phase-shifted signals in this way, without the use of optical polarization components, considerably reduces manufacturing costs and the complexity of the corresponding position measuring arrangements. Since on the average polarizations absorb half the impinging radiation output, the energy efficiency, and therefore the positional noise, of the position measuring arrangement is furthermore clearly improved in comparison with the known systems with optical polarization components.

In order to keep resultant errors by the position measuring arrangement in case of possible tilting of the reflection scale graduation low, and to achieve large tolerances regarding the scanning distance, the optical scanning device (in the beam path between the splitting and combining of the partial beam paths) is installed symmetrical with respect to a plane parallel with the line direction of the measuring graduation of the reflection scale graduation and the optical axis, and the illumination direction is selected parallel with the optical axis. Because of this, identical optical path lengths result for both interfering partial light beams. Viewed in the line direction, the partial light beams impinge perpendicularly on the reflection scale graduation and are therefore not displaced in the line direction in case of changes in the distance. Viewed in the measuring direction and as a function of the embodiment, either no beam displacements occur, or only symmetrical beam displacements of both partial light beams. These conditions in regard to the beam displacements result in an effective measuring location, which remains constant even in case of changes of the scanning distance. An important demand made on highly accurate position measuring arrangements is thus met.

The exemplary embodiments described in what follows, all of which are based on the above explained basic principles in accordance with the invention, differ, inter alia, by the position of the neutral center of rotation, their sensitivity to soiling, as well as the respective energy efficiency.

First Embodiment

Figure 1B:
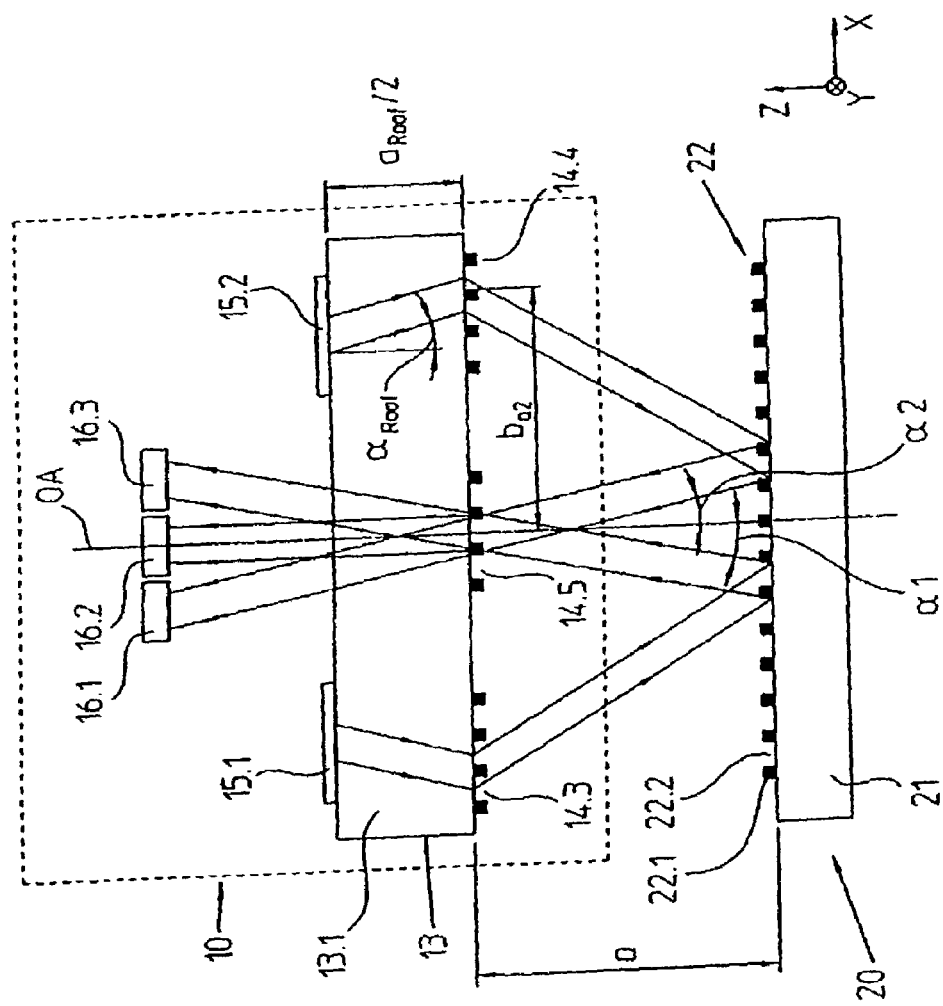
Figure 1D:
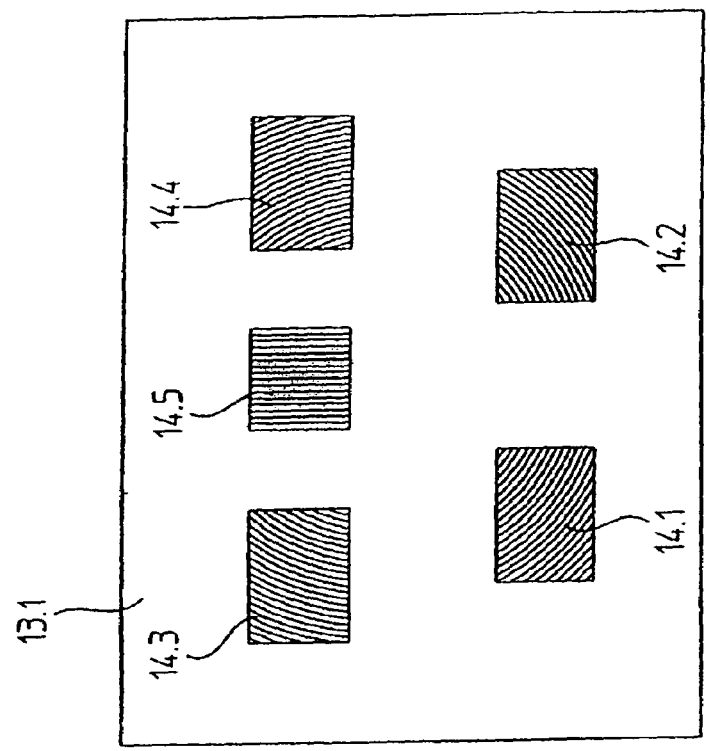
FIGS. 1c and 1d respectively show a plan view of a top and underside of an embodiment of a scanning plate used with the position measuring arrangement of FIG. 1a in accordance with the present invention.
Figure 1C:
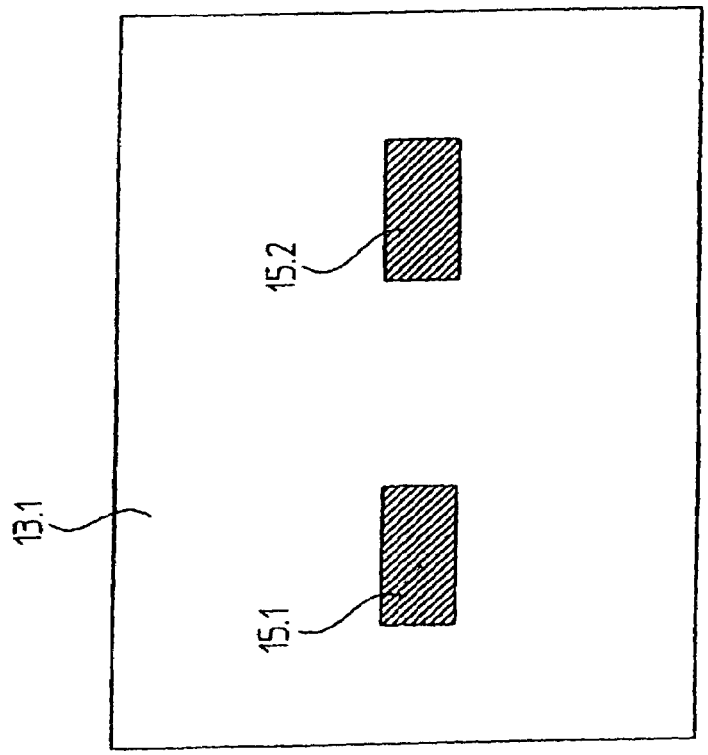

A first embodiment of the position measuring arrangement in accordance with the invention will be explained in what follows by FIGS. 1a to 1d. Here, FIGS. 1a and 1b respectively show in a schematized form partial scanning beam paths in a lateral view in the x-z plane. The scanning beam path from the light source 11 until the partial light beams impinge on the reflector elements 15.1, 15.2, is represented in FIG. 1a. FIG. 1b shows the scanning beam path following the partial light beams impinging on the reflector elements 15.1, 15.2 as far as the detector elements 16.1, 16.2, 16.3. FIGS. 1c and 1d respectively show views from above on the top and underside of the scanning plate 13 with the optical elements arranged there.

In this example, the position measuring arrangement in accordance with the present invention includes a reflection scale graduation 20, as well as a scanning unit 10, which can be moved in relation to it in at least one measuring direction x. The objects, whose relative position is to be determined with the aid of the position measuring arrangement, are coupled in a known manner with the reflection scale graduation 20 and the scanning unit 10. For example, these can be parts of a machine, whose relative position must be precisely detected. The signals, or position data, generated by the position measuring arrangement, are further processed by an electronic follow-up device or evaluation unit, not represented, for controlling the machine.

A position measuring arrangement for detecting linear movements, having a linearly extending reflection scale graduation 20, is represented in the present exemplary embodiment; it is of course also possible to realize rotary position measuring arrangements on the basis of the considerations in accordance with the present invention.

In what follows, the scanning beam path of the first embodiment of the position measuring arrangement in accordance with the present invention will be explained in detail by FIGS. 1a to 1d.

In the example represented, the light beam emitted by the light source 11, for example a laser light source, is first collimated by an optical collimation device 12, i.e., is converted into parallel light beam. Thereafter, the collimated light beam passes, not diffracted, through the support substrate 13.1 of a scanning plate 13. The support substrate 13.1 is embodied in the form of a plan-parallel glass plate. Various optical elements are arranged on its top and underside, whose function in the scanning beam path will be addressed in detail in what follows. These elements can be seen in the plan views of FIGS. 1c and 1d.

Following its passage through the scanning plate 13, the collimated light beam impinges a first time on the reflection scale graduation 20, namely on the measuring graduation 22 extending in the measuring direction x. In a known manner, the measuring graduation 22 includes an arrangement, periodic in the measuring direction x, of partial areas 22.1, 22.2 having different optical reflection properties. The line-shaped partial areas 22.1, 22.2 extend perpendicularly with respect to the measuring direction x in the shown direction y (also called line direction in what follows) and are arranged on a support body 21 of the reflection scale graduation 20. In the example represented, the measuring graduation 22 is designed as an incident light phase grating, in which the partial areas 22.1, 22.2 have a different phase-shifting effect on the light beams impinging on them. Furthermore, a layout of the measuring graduation 22, in which the diffraction efficiency in the first orders is maximized, is advantageous. In what follows, the graduation period of the measuring graduation 22 will be called $TP_M$ and is defined as the length of two successive partial areas 22.1, 22.2 in the measuring direction x. In a possible embodiment, the graduation period $TP_M$ is selected in the range between $1.1*\lambda$ and $10*\lambda$, wherein x is the wavelength of the light source 11 used. In the case of a light source embodied as a VCSEL or LED, with $\lambda=860$ nm, the graduation period $TP_M$ therefore could be $TP_M=2$ µm.

Following the first impinging on the reflection scale graduation 20 at a first impact point, the result is the splitting of the impinging light beam into two partial light beams, which correspond to the +/−1st orders of diffraction and are reflected back to the scanning unit 10. The back-reflected partial light beams initially pass through the scanning gratings 14.1, 14.2, represented in FIG. 1a on the underside of the scanning plate 13. In the instant example, the scanning gratings 14.1, 14.2 are designed as transmission gratings. The partial light beams are deflected in a defined way by the scanning gratings 14.1, 14.2 and then reach flat reflector elements 15.1, 15.2 on the top of the scanning plate 13. The two scanning gratings 14.1, 14.2, through which a passage had been first made, have the same graduation period, which will be called $TP_{AG1}$ in what follows. In the instant first exemplary embodiment, the graduation period $TP_{AG1}$ of the scanning gratings 14.1, 14.2 is selected to be different from the graduation period $TP_M$ of the measuring graduation 22. Based on this selection of the graduation periods $TP_{AG1}$, the partial light beams are not propagated perpendicularly in relation to the scanning plate 13 after having passed through the scanning gratings 14.1, 14.2.

As represented in FIG. 1b, a back reflection of the partial light beams in the direction of the reflection scale graduation 20 takes place at the reflector elements 15.1, 15.2. Prior to impinging on the reflection scale graduation 20 a second time at second impact points, which differ from the first impact point, the partial light beams pass through the two further scanning gratings 14.3, 14.4, which are also arranged on the underside of the scanning plate 13. A renewed deflection of the transmitted partial light beams takes place via these scanning gratings 14.3, 14.4 in the direction of the respective second impact point of the reflection scale graduation 20. The two scanning gratings 14.3, 14.4, through which a passage has taken place, have the same graduation period, which will be called $TP_{AG2}$ in what follows.

As described in DE 10 2005 029 917.2 and U.S. Patent Application Publication No. US 2007/0013920 A1, the entire contents of which are incorporated herein by reference, of Applicant, the scanning gratings 14.1 to 14.4 have a dual optical function. On the one hand, in the measuring direction x they act in the manner of a regular periodic deflection grating, having the graduation periods $TP_{AG1}$, or $TP_{AG2}$. On the other hand, in the line direction y in the scale graduation plane they act like cylinder lenses, which focus the incoming light beams on the reflector elements 15.1, 15.2, and thereafter collimate them again. In the example represented in FIGS. 1a and 1b, the scanning gratings 14.1, 14.2 focus, while the scanning gratings 14.3, 14.4 collimate the outgoing light beams again. The combination of reflector element and lens represents—as described in DE 10 2005 029 917.2 of Applicant—a retro-reflector element for the line direction y of the scale graduation 20. Because of the offset in the y-direction between the light beams and the optical axes of the cylinder lenses, a simultaneous offset in the y-direction between the first and second impact points on the reflection scale graduation 20 is achieved. So that the scanning gratings can simultaneously take on all of these optical functions, they must be designed as gratings with curved grating lines, as described in the mentioned DE 10 2005 029 917.2 and indicated in a schematized manner in the subsequent FIG. 1d. In what follows, such grating structures will also be referred to as diffractive deflection/lens elements.

The component includes the scanning plate 13 with the support substrate 13.1, the scanning gratings 14.1, 14.2, 14.3, 14.4, as well as the flat reflector elements 15.1, 15.2, therefore functions as a retro-reflector element on the part of the scanning unit 10 in the first exemplary embodiment represented. By these, a re-deflection of the partial light bundles coming from the reflection scale graduation 20 in the direction of the reflection scale graduation 20 takes place in order to act a second time on the latter. Here, the retro-reflection takes place in the stated y-direction.

An alternative embodiment of the retro-reflector element will be explained by the following modification of the first embodiment of the position measuring arrangement in accordance with the present invention with the use of FIGS. 2a to 2e.

In the represented first exemplary embodiment in FIGS. 1a to 1d, a renewed diffraction and back-reflection of the impinging partial light beams in the direction of the scanning unit 10 takes place on the reflection scale graduation 20 at the respective impact points. In the course of this, the partial light beams used for signal generation impinge at symmetrical angles α1, α2 with respect to the optical axis OA at the same location on a combining grating 14.5, which is arranged on the underside of the scanning plate 13.

Here, the optical axis OA is oriented parallel with the direction z shown in the drawing figures. In this case the direction z extends perpendicularly in regard to the plane defined between the measuring direction x and the line direction y.

After renewed diffraction at the combining grating 14.5, three interfering pairs of partial light beams then are propagated in the direction of the three downstream located detector elements 16.1, 16.2, 16.3. For this purpose, the graduation period $TP_{VG}$ of the combining grating 14.5, in this example also embodied as a transmission grating, has been selected in such a way that several resulting partial light beams exit, each of which includes co-linearly superimposed, and therefore interfering, portions of both impinging partial light beams. It is particularly advantageous if respectively one of the two first orders of diffraction of the combining grating 14.5 deflects the two impinging partial light beams parallel with respect to the optical axis OA. In this case partial light bundles from orders of diffraction interfere, whose orders of diffraction differ by two.

In the case of the relative shifting of the reflection scale graduation 20 and the scanning unit 10, respective path differences between the pairs of interfering partial light beams result, which are propagated in the direction of the detector elements 16.1, 16.2, 16.3. In that case, signals modulated as a function of the shifting are present at the detector elements 16.1, 16.2, 16.3, which are phase-shifted by respectively 120° from one detector element to another detector element. These phase-shifted signals can be further processed in a known manner by downstream-located, non-represented electronic follow-up devices.

Phase-shifting of the signals can be assured by a suitable design of the combining grating 14.5, such as is known, for example, from EP 163 362 B1 and U.S. Pat. No. 4,776,701, the entire contents of which are incorporated herein by reference. In this case the different phase shift of the individual orders of diffraction in the course of diffraction at the combining grating 14.5 is appropriately adjusted by the selection of the grating structure. For example, a phase grating structure of a strip width corresponding to ⅓ or ⅔ of the periodicity $TP_{VG}$ of the combining grating 14.5, is advantageous; the phase deviation of the strips is selected as 120° and 240°. Alternatively to this it is also possible to utilize so-called super-grating structures on the part of the combining grating 14.5, such as are known, for example, from EP 446 691 B1 and U.S. Pat. No. 5,430,546, the entire contents of which are incorporated herein by reference.

For realizing the explained scanning beam path, further definite dimensioning rules regarding the graduation periods of the various scanning gratings 14.1, 14.2, 14.3, 14.4 must be obeyed, besides the dimensioning rules already discussed above. These will be briefly sketched in what follows.

The distance $b_{a1}$ of the first impact location of the partial light beams at the underside of the scanning plate 13 following the first impingement on the reflection scale graduation 20 (see FIG. 1a) from the optical axis OA is the result of the following equation:

$$b_{a1} = a * \mathrm{Tan}(\mathrm{ArcSin}(\lambda/TP_M)) \qquad \text{Eq. 1.1}$$

wherein:
a=scanning distance between the reflection scale graduation and the scanning unit
λ=wave length of the light source
$TP_M$=graduation period of the measuring graduation.

If the beam path is followed backward from the combining grating 14.5, the distance $b_{a2}$ of the impact location is obtained, where the partial light beam impinges on the underside of the scanning plate 13 prior to impinging on the reflection scale graduation 20 (FIG. 1b):

$$b_{a2} = a * ((\mathrm{Tan}(\mathrm{ArcSin}(\lambda/TP_{VG})) + \mathrm{Tan}(\mathrm{ArcSin}(\lambda/TP_{VG} + \lambda/TP_M))) \qquad \text{Eq. 1.2}$$

wherein:
$TP_{VG}$=graduation period of the combining grating

The beam angle $\alpha_{Roof}$ of between the two scanning gratings 14.1, 14.2 on the one hand, and the scanning gratings 14.3, 14.4 on the other hand, results from the optical path $a_{Roof}$ which is traveled between the scanning gratings 14.1, 14.2, through which passage occurs first, and the scanning gratings 14.3, 14.4, through which passage subsequently occurs:

$$\alpha_{Roof} = \mathrm{ArcTan}((b_{a1}-b_{a2})/a_{Roof}) \qquad \text{Eq. 1.3}$$

It is now possible to determine the required graduation periods $TP_{AG1}$, $TP_{AG2}$ of the scanning gratings 14.1 to 14.4:

$$1/TP_{AG1} = 1/TP_M - (n_a * \sin(\alpha_{Roof}))/\lambda \qquad \text{Eq. 1.4}$$

$$1/TP_{AG2} = 1/TP_M + 1/TP_{VG} + (n_a * \sin(\alpha_{Roof}))/\lambda \qquad \text{Eq. 1.5}$$

wherein:
$n_a$=the index of diffraction of the scanning plate.

In actual use, the position of the so-called neutral center of rotation is decisive in regard to the properties of such a position measuring arrangement. Here, the neutral center of rotation is to be understood as that center around which the reflection scale graduation can be tilted without the position value indicated by the position measuring arrangement changing.

Now, a scanning beam path in accordance with the first embodiment of the position measuring arrangement in accordance with the present invention results in the neutral center of rotation of the system being located below the plane of the reflection scale graduation. If care is taken that the neutral center of rotation is located in the so-called neutral axis of the reflection scale graduation, the negative influence of possible bending of the reflection scale graduation can be advantageously minimized.

The described first embodiment can also be slightly modified in that, in place of the +1st (−1st) order of diffraction of the reflection scale graduation, the −1st (+1st) order of diffraction is used. In this case it is necessary in the dimensioning equations shown above to replace $TP_M$ by $-TP_M$, $TP_{AG1}$ by $-TP_{AG1}$, and $TP_{AG2}$ by $-TP_{AG2}$. In this case the neutral center of rotation is located above the reflection scale graduation.

Modification of the First Embodiment

A further modification of the first embodiment of the position measuring arrangement in accordance with the present invention is represented in FIGS. 2a to 2e.

The decisive difference in comparison with the previously explained variation in FIGS. 1a to 1d here lies in a changed design of the retro-reflector element. Now the retro-reflector element is embodied as a ridge prism 618 with a prism angle of 90°, whose ridge 618.1 is oriented parallel with respect to the measuring direction x. The scanning gratings 614.1 to 614.4, as well as the combining grating 614.5, are arranged on the underside of the ridge prism 618, which can be seen in the plan view of the underside of the ridge prism 618 in FIG. 2e. Regarding such reflector elements, reference is also made to WO 2002/023131 A1 mentioned at the outset.

Otherwise the scanning beam path basically corresponds to that in the example in accordance with FIGS. 1a to 1d.

Figure 2B:
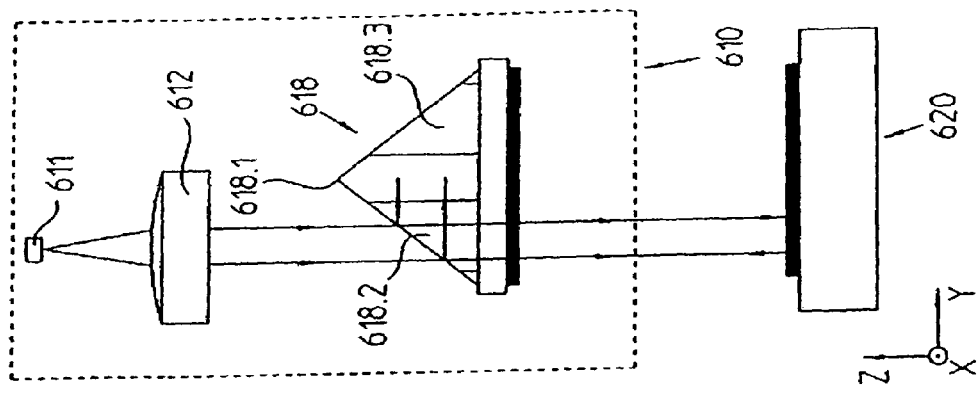
FIG. 2b shows the portion of the scanning beam path in FIG. 2a in another view.
Figure 2A:
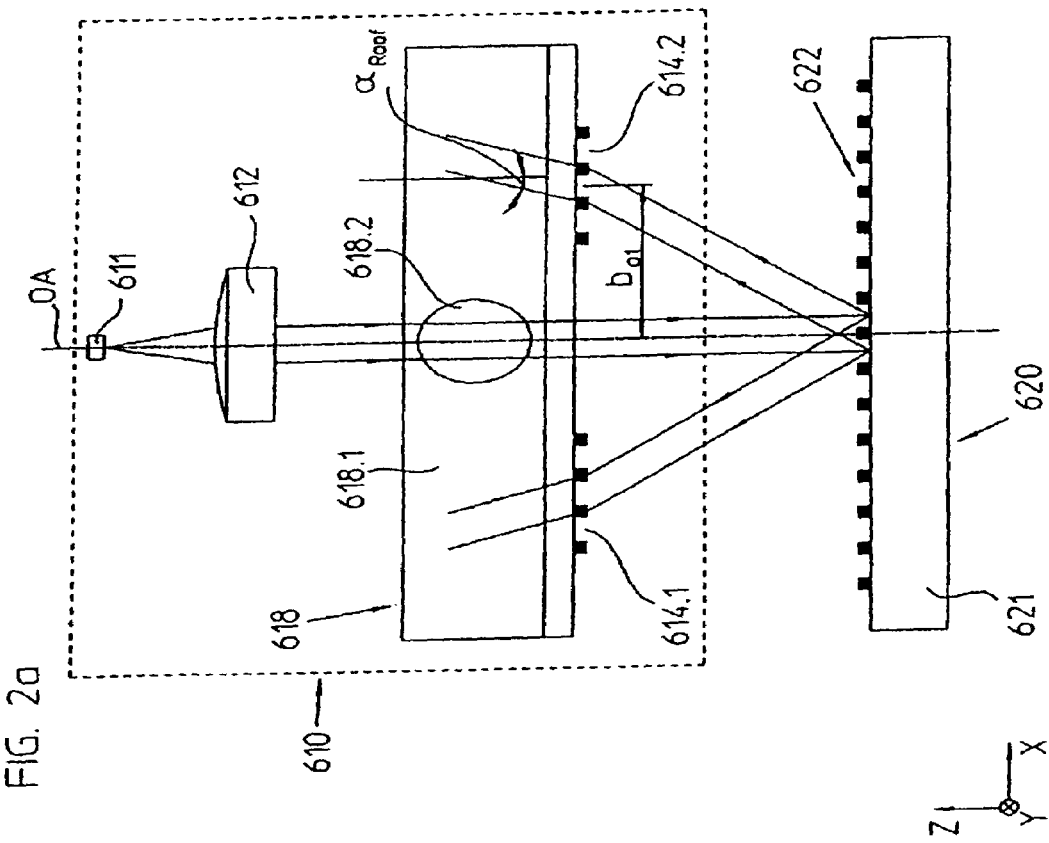
FIG. 2a represents a first portion of a scanning beam path of a variation of the first embodiment of the position measuring arrangement of FIGS. 1a-d in accordance with the present invention.
Figure 2E:
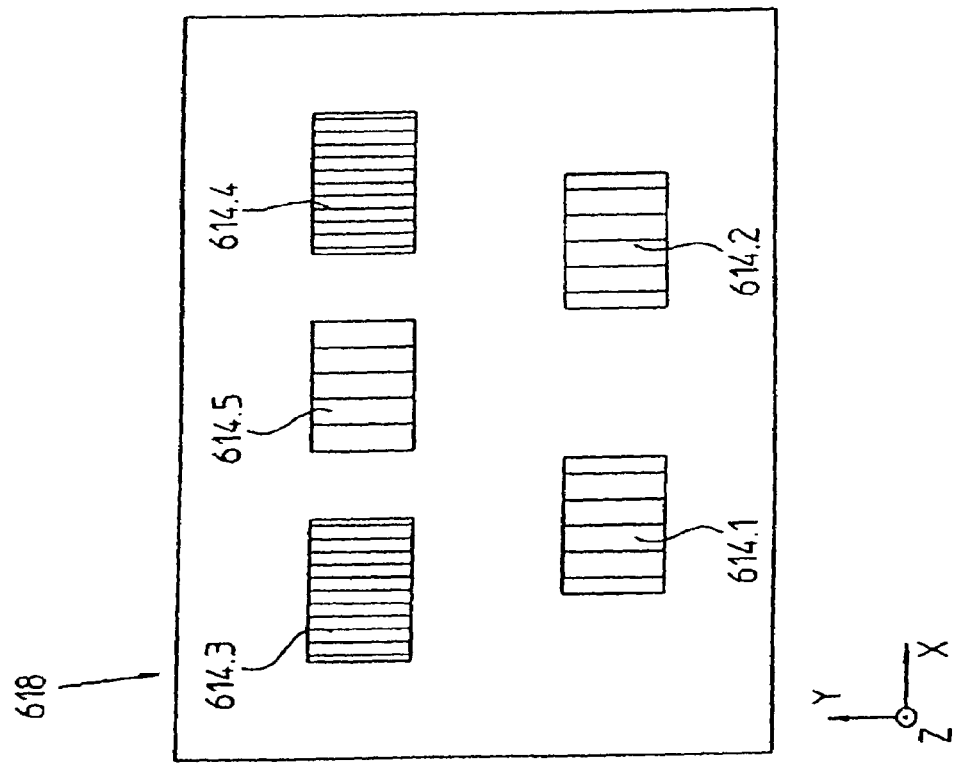
FIG. 2e is a plan view of a second embodiment of a scanning plate to be used with the position measuring arrangement of FIG. 2a in accordance with the present invention.

In various plan views, FIGS. 2a and 2b represent the scanning beam path from the light source 611 via the optical collimator device 612, the first impinging of the collimated light beam on the measuring graduation 622 of the reflection scale graduation, the back reflection of the diffracted partial light beams in the direction toward the scanning unit 610, and the passage through the scanning gratings 614.1, 614.2 to approximately the center of the ridge prism 618. The further scanning beam path in the form of the back deflection of the partial light beams in the direction toward the reflection scale graduation 620, the passage through the scanning gratings 614.3, 614.4, the second impinging on the reflection scale graduation 620, the second back reflection in the direction of the scanning unit 610, the passage through the combining grating 614.5 and propagation of the three pairs of interfering partial light beams toward the three detector elements 616.1, 516.2 and 515.3 is represented in various views in FIGS. 2c and 2d.

As mentioned above, in this modification of the first embodiment of the position measuring arrangement in accordance with the present invention, in place of the scanning plate component with diffractive cylinder lenses, or diffractive deflection/lens elements and flat reflector elements in FIGS. 1a to 1d, a ridge prism 618 in the form of a 90° deflection prism is now used for retro-reflection, whose ridge 618.1 is oriented parallel with respect to the measuring direction x. In the central area, the ridge prism 618 has two bores 618.2, 618.3, or optically non-effective through-openings, through which the illuminating light beam can be propagated to the reflection scale graduation 620, or the back-reflected partial light beams to the detector elements 616.1, 616.2, 616.3. The scanning gratings 614.1 to 614.4 are embodied as periodic gratings with straight grating strips, which exert a deflection effect on the different partial light beams only in the measuring direction x.

This variation of the first embodiment of the position measuring arrangement in accordance with the present invention does not require finely structured scanning gratings as the above example and is advantageous in those cases where, for reasons of technology, the production of such finely structured scanning gratings is too expensive, or where perhaps the polarization properties of too fine gratings have disadvantageous effects.

In principle, embodiments yet to be explained in what follows can each also be designed in accordance with the above described variations. This means that in one case the retro-reflector element is constituted by diffractive cylinder lenses superimposed on the effect of the scanning gratings which act deflectingly in the measuring direction (diffractive deflection/lens elements) and by the reflector elements on the top of the scanning plate. In the other case, the reflector element is designed in the form of a 90°-ridge prism with a ridge parallel with respect to the measuring direction x.

Second Embodiment

A second embodiment of the position measuring arrangement in accordance with the present invention will be explained in what follows by FIGS. 3a to 3d. In principle, these drawing figures again show the same views of the position measuring arrangement as in the above example in FIGS. 1a to 1d.

In this example it has again been assured by the realized scanning beam path, or the arrangement of the various optical elements, in particular in the scanning unit 110, that a pair of light beams impinges in a non-parallel manner on the combining grating 114.5 in front of the detector elements, and several pairs of co-linear and interfering partial light beams are propagated downstream of the combining grating 114.5 in the direction of the detector elements 116.1 to 116.3.

The essential differences in regard to the first exemplary embodiment in FIGS. 1a to 1d will be explained in what follows. Thus, supplementing the first example it has been provided to arrange a splitting grating 114.6 in the form of a transmission grating in the collimated beam path of the light beam downstream of the optical collimation device 112. Here, the splitting grating 114.6 has a graduation period $TP_{AG0}$ which corresponds to the graduation period $TP_{VG}$ of the combining grating 114.5 arranged downstream in the scanning beam path, i.e. $TP_{AG0}=TP_{VG}$. Splitting of the light beam into two diffracted light beams takes place by the splitting grating 114.6, which are then propagated in the direction of the reflection scale graduation 120. In this variation, the two partial light beams impinge on the reflection scale graduation 120 at two different impact locations, where splitting into further partial light beams then takes place and which are reflected back in the direction toward the scanning unit 110. The back-reflected partial light beams, which are deflected at the reflection scale graduation 120 in +1st and −1st orders of diffraction, impinge on the scanning gratings 114.1, 114.2. These deflect the respective partial light beams in the measuring direction x in such a way, that in this x-direction they extend parallel with respect to the optical axis AO. In the y-direction, the scanning gratings 114.1, 114.2 act as diffractive cylinder lenses in accordance with the above embodiment in FIGS. 1a to 1d, which refocus the partial light beams on the reflector elements 115.1, 115.2. Following this, the scanning gratings 114.3, 114.4 collimate the partial light beams in the y-direction and guide them, slanted in the measuring direction x, on the reflection scale graduation 120. Therefore the scanning gratings function as diffractive deflection/lens elements. The subsequent beam path corresponds to that in the exemplary embodiment from FIGS. 1a to 1d.

By the placement of the splitting grating 114.6 into the scanning beam path it is assured in this second exemplary embodiment that the partial light beams impinging on the combining grating 114.5 impinge at the same location on this combining grating 114.5. In contrast to the first exemplary embodiment, this applies to all scanning distances between the reflection scale graduation 120 and the scanning unit 110. Therefore this embodiment of the position measuring arrangement in accordance with the present invention provides more stable output signals, which are also independent of fluctuations of the light wavelength used.

Figure 3A:
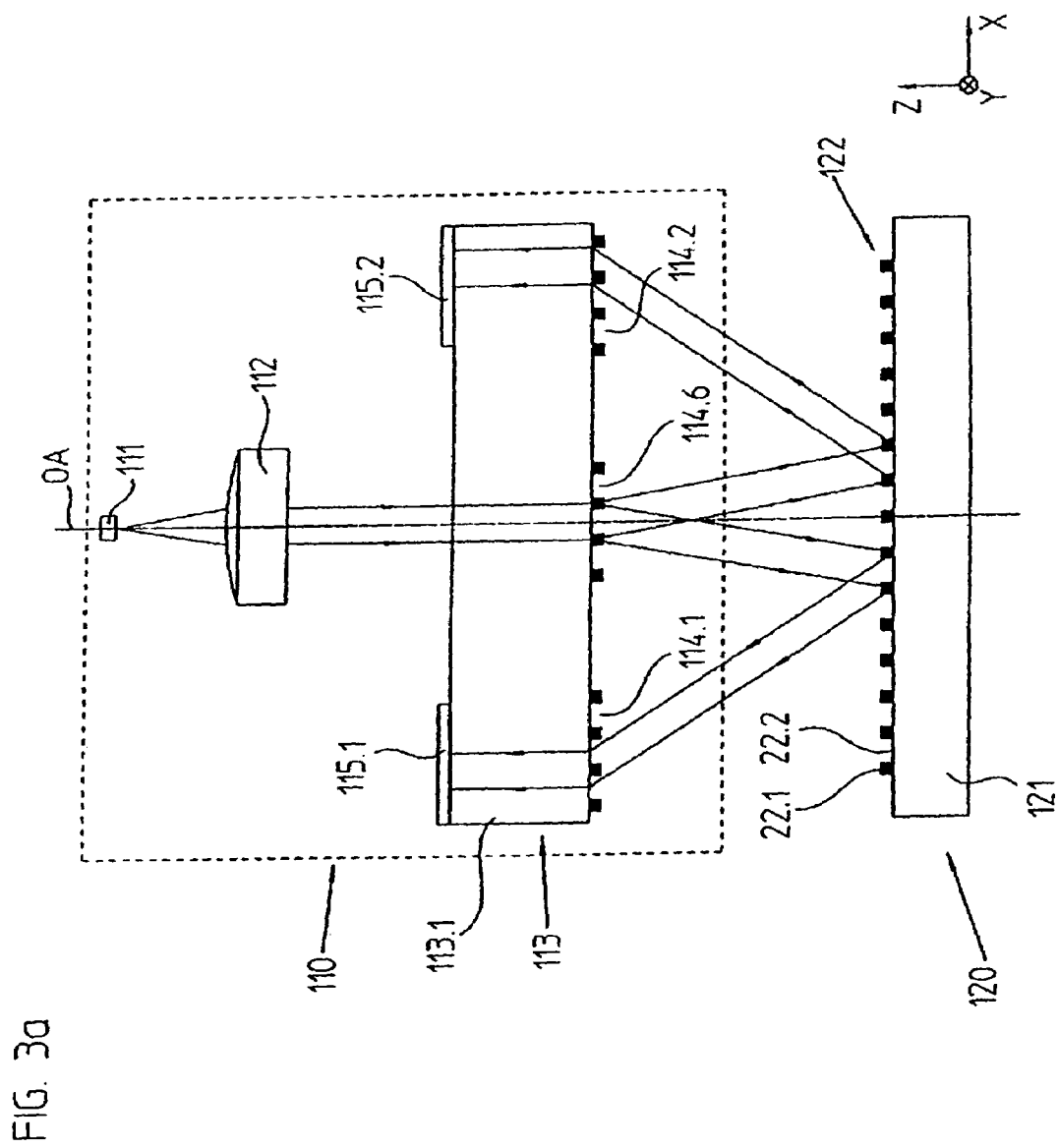
FIG. 3a represents a first portion of a scanning beam path of a second embodiment of a position measuring arrangement in accordance with the present invention.
Figure 3B:
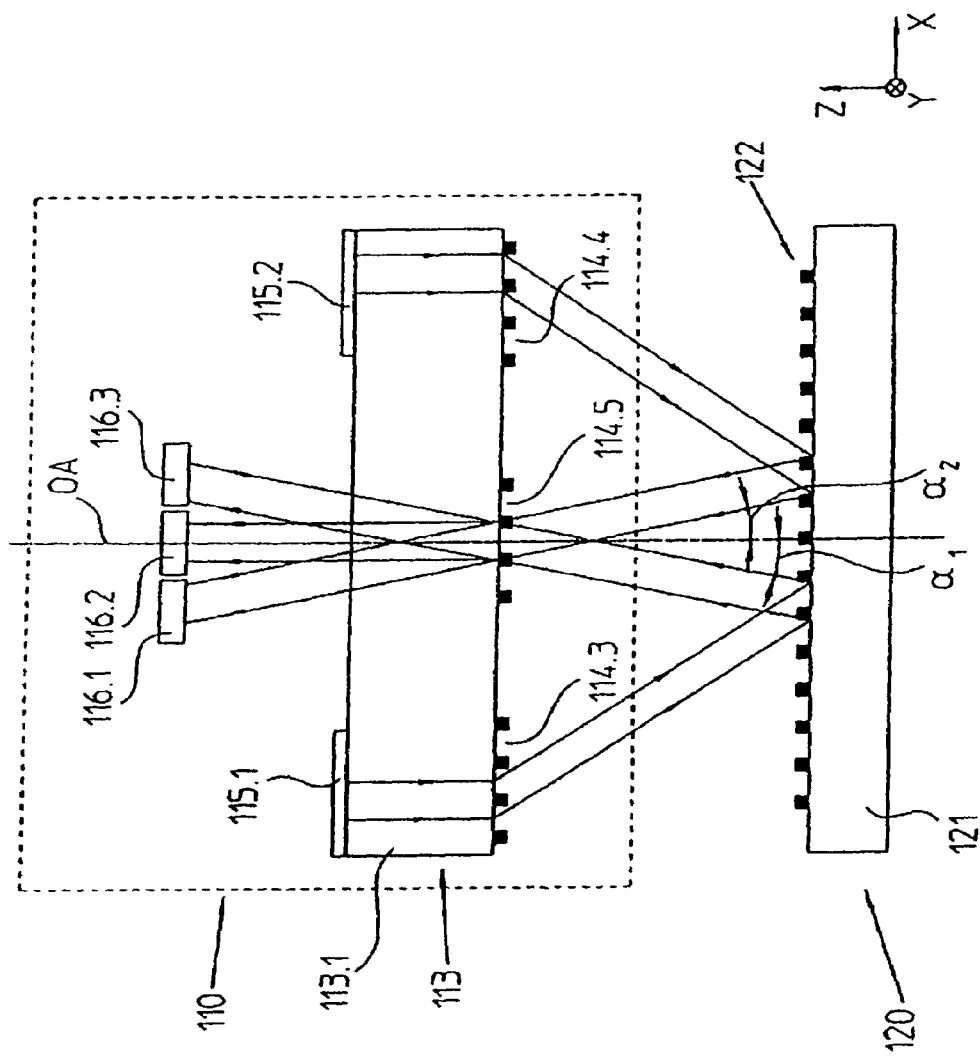
FIG. 3b represents a second portion of the scanning beam path of the position measuring arrangement of FIG. 3a in accordance with the present invention.
Figure 3D:
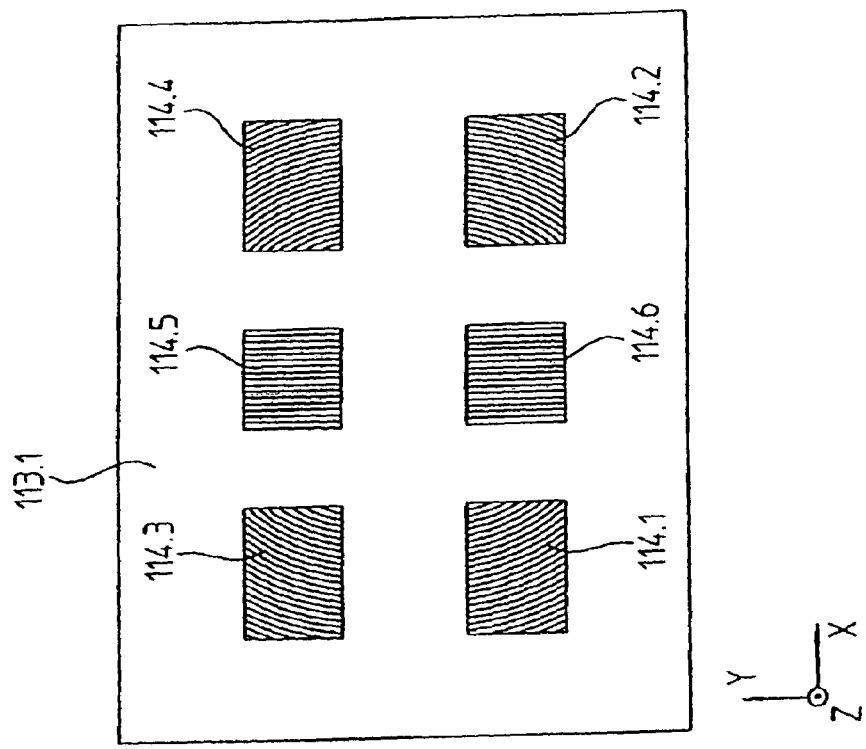
FIGS. 3c and 3d, respectively, show a plan view of a top and underside of a third embodiment of a scanning plate to be used with the position measuring arrangement of FIG. 3a in accordance with the present invention.
Figure 3C:
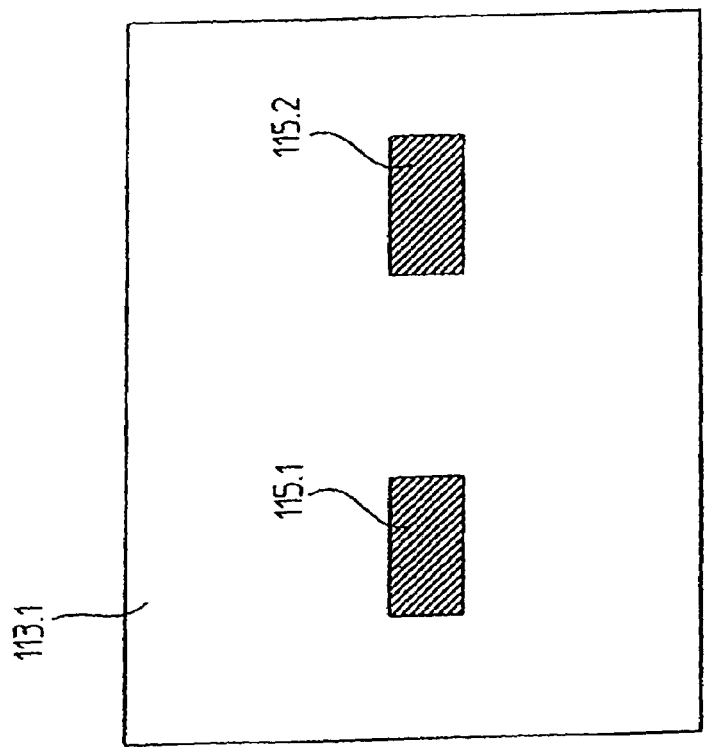
Figure 4B:
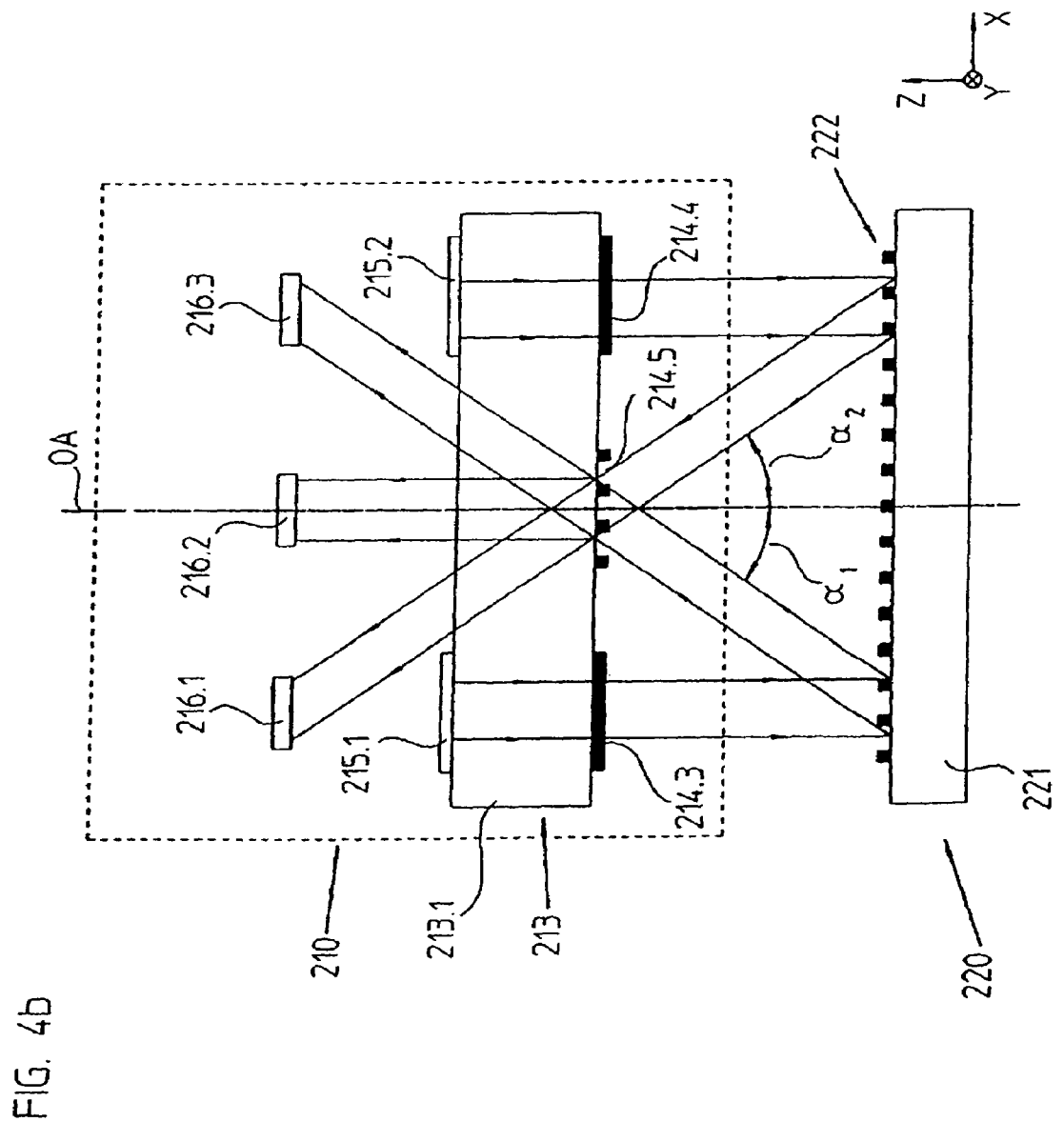
FIG. 4b represents a second portion of the scanning beam path of the position measuring arrangement of FIG. 4a in accordance with the present invention.
Figure 4D:
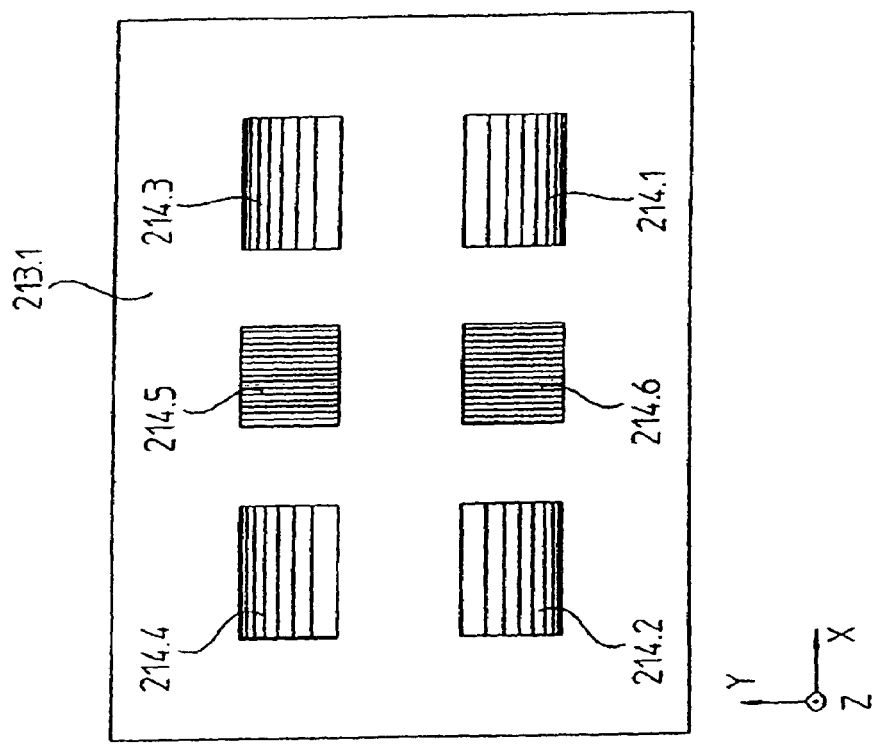
FIGS. 4c and 4d, respectively, show a plan view of a top and underside of a fourth embodiment of a scanning plate to be used with the position measuring arrangement of FIG. 4a in accordance with the present invention.
Figure 4C:
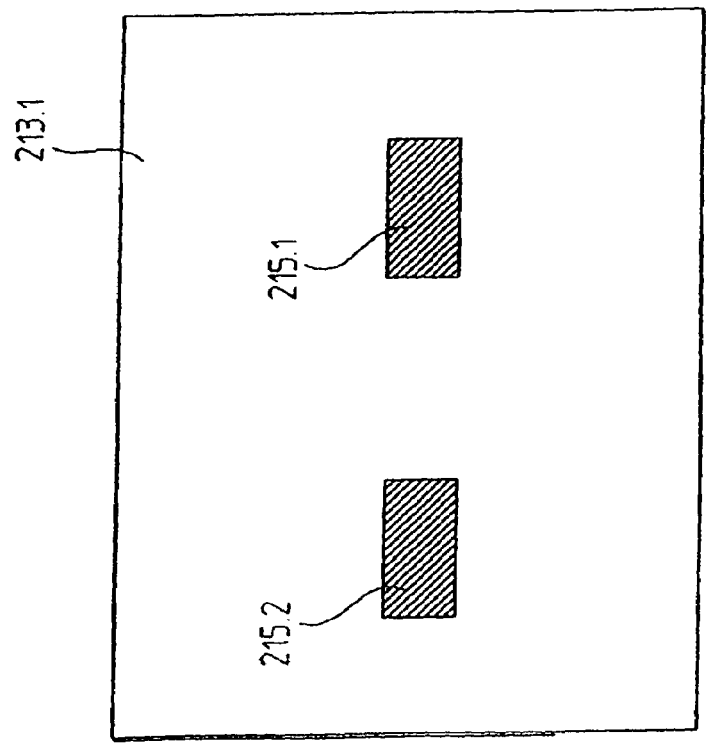
Figure 5B:
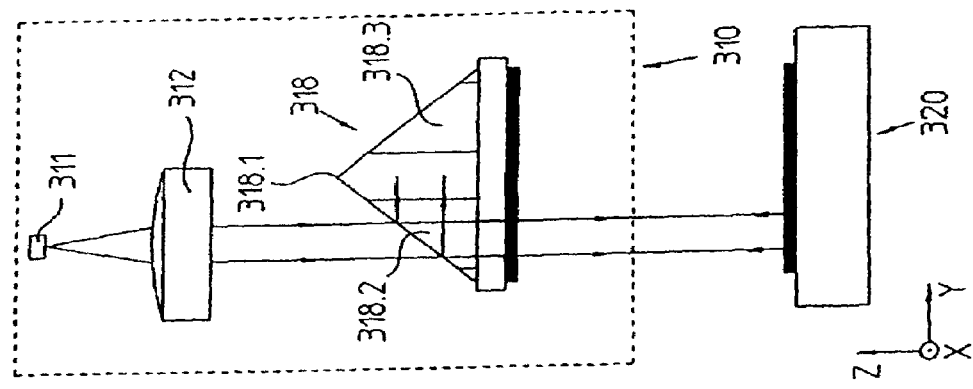
FIG. 5b shows a portion of the scanning beam path of FIG. 5a in another view.
Figure 5A:
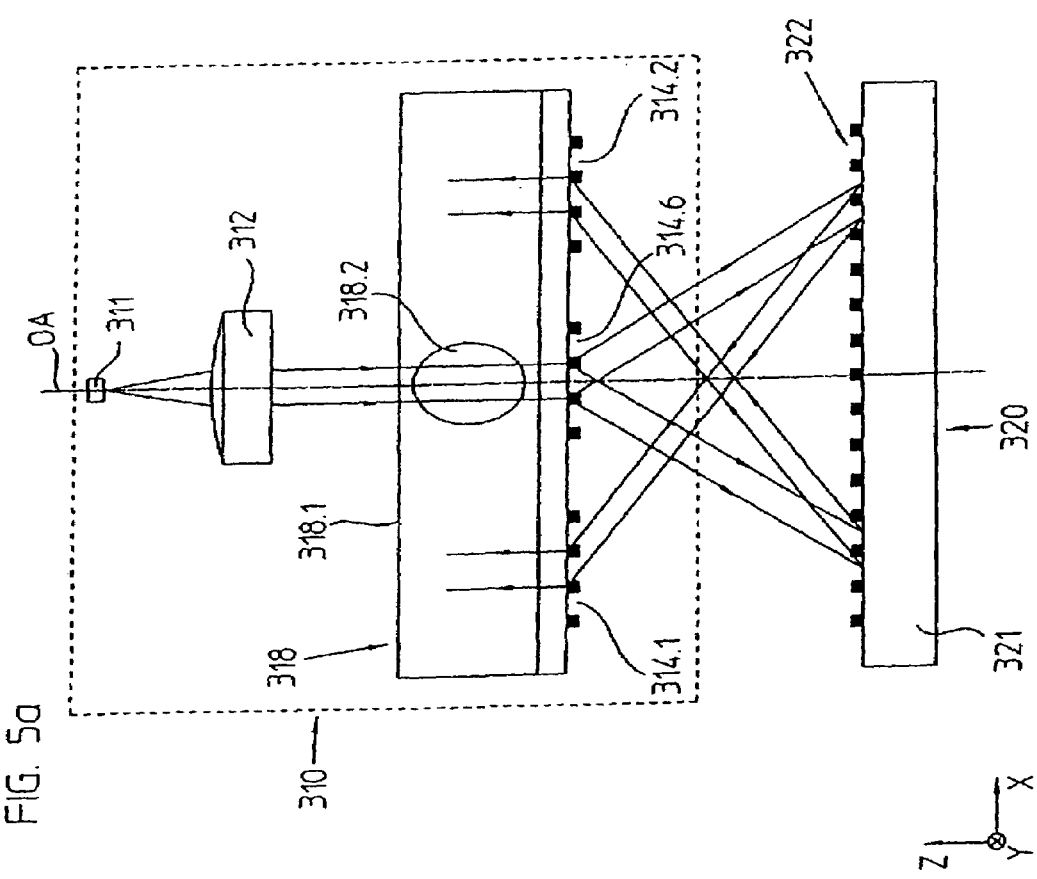
FIG. 5a represents a first portion of a scanning beam path of a second variation of the second embodiment of the position measuring arrangement of FIGS. 3a-d in accordance with the present invention.
Figure 5E:
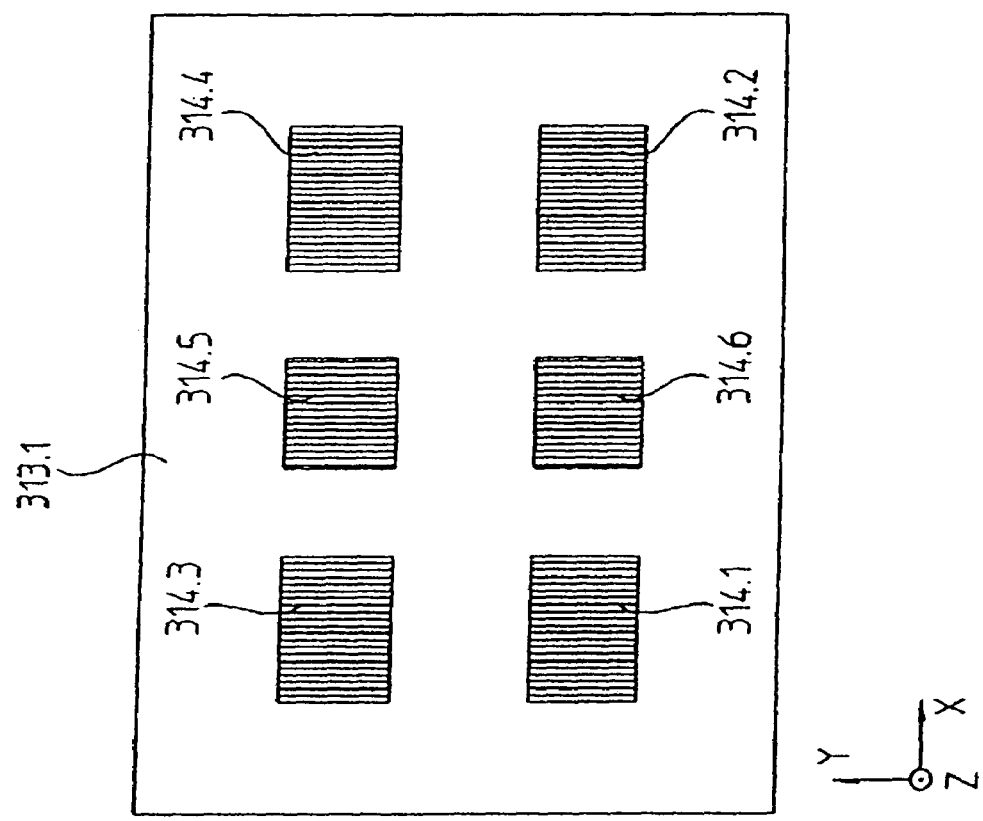
FIG. 5e is a view from above on a fifth embodiment of a scanning plate to be used with the position measuring arrangement of FIG. 5a in accordance with the present invention.

As in the example of FIGS. 1a to 1d, the retro-reflector functionality is realized in the scanning unit 110 by the component with the scanning plate 13. On the underside of the latter, which faces the reflection scale graduation, the scanning gratings 114.1 to 114.4, the combining grating 114.5, as well as the splitting grating 114.6, are arranged as shown in FIG. 3d. In accordance with the view from above in FIG. 3c, the two flat reflector elements 115.1, 115.2 are arranged on the top of the scanning plate 113.

In this example the graduation periods $TP_{AG1}$ of the scanning gratings 114.1, 114.2, as well as the graduation periods $TP_{AG2}$, are preferably determined in accordance with the following equation (2.1):

$$1/TP_{AG1} = 1/TP_{AG2} = 1/TP_M + 1/TP_{VG} \quad \text{Eq. 2.1}$$

wherein:
$TP_M$ = graduation period of the measurement graduation
$TP_{VG}$ = graduation period of the combining grating Similar to the first example, in this embodiment the position of the neutral center of rotation also results below the plane of the reflection scale graduation. Again, a modification of this embodiment can be described by replacing $TP_M$ with $-TP_M$, $TP_{AG1}$ with $-TP_{AG1}$, as well as $TP_{AG2}$ with $-TP_{AG2}$, wherein the neutral center of rotation then is located above the reflection scale graduation 120.

First Modification of the Second Embodiment

A first modification of the second embodiment will be described in what follows by FIGS. 4a to 4d. These drawing figures again show the same views of the position measuring arrangement as in connection with the above second exemplary embodiment.

Regarding the scanning beam path in principle, this variation corresponds to the previous example with the splitting grating 214.6 downstream of the optical collimation device 212. The graduation period $TP_{AG0}$ of this is selected in this example in accordance with the following equation (3.1):

$$TP_{AG0} = TP_{VG} = TP_M \quad \text{Eq. 3.1}$$

wherein:
$TP_{VG}$ = graduation period of the combining grating
$TP_M$ = graduation period of the measurement graduation.

The instant variation represents a special case of the second embodiment, wherein $1/TP_{AG1} = 1/TP_{AG2} = 0$. This means that the respective structure on the scanning plate 213 no longer deflects in the measuring direction x and therefore is embodied purely as a Fresnel cylinder lens in the y-direction.

Therefore, in contrast to the previous example, in this variation the scanning gratings 214.1, 214.2 on the underside of the scanning plate 213 are embodied as Fresnel cylinder lenses in the y-direction, i.e. not as grating cylinder lens structures as in FIGS. 3a to 3d. In this connection reference is made in particular to FIG. 4d, which shows the underside of the scanning plate 213 with the elements arranged there.

Alternatively thereto, an embodiment of the scanning gratings 214.1 to 214.4 as blazed Fresnel cylinder lenses or as off-axis Fresnel lenses is also possible.

Based on this embodiment of the scanning gratings 214.1, 214.2 in the scanning unit 210, a slightly altered scanning beam path than in the previous example of FIGS. 3a to 3d results in this example. Thus, the partial light beams impinging for the first time on the reflection scale graduation 220, or the orders of diffraction employed for signal generation, are now reflected back to the scanning unit 210 perpendicularly, as can be seen in FIG. 4a.

As a consequence of this different scanning beam path, a different location of the neutral center of rotation results in this example. Thus, in contrast to the previously described variation, it is located approximately at the level of double the scanning distance above the reflection scale graduation plane. In this way flexible options result in connection with certain applications of the position measuring arrangement in accordance with the invention for placing the location of the neutral center of rotation to the desired spot by a defined design of the scanning beam paths.

Otherwise the scanning beam path in this example basically corresponds to the one in FIGS. 3a to 3d.

If, in a further modification of this variation, the combination of Fresnel cylinder lenses 214.1 to 214.4 and reflector elements 215.1, 215.2 is replaced by a ridge prism analogous to the example in FIGS. 2a to 2d, the scanning gratings 214.1 to 214.4 can be entirely omitted, since neither a deflecting effect in the measuring direction x nor a lens action in the y-direction is required. The small number of gratings to be passed results in a particularly great signal strength in a corresponding position measuring arrangement.

Second Modification of the Second Embodiment

A second modification of the second embodiment of the position measuring arrangement in accordance with the present invention is represented in FIGS. 5a to 5e. Again, these drawing figures show the same views of the position measuring arrangement as in the above example in FIGS. 2a to 2e.

For one, the variation in accordance with FIGS. 5a to 5e differs from the two previous examples by the selection of the graduation periods of the splitting grating and the graduation period $TP_M$ of the reflection scale representation 320. The graduation period $TP_M$ of the reflection scale representation 320 in particular has been selected such that the partial light beams impinging for the first time on the reflection scale graduation 320 are deflected back to the scanning unit 310 in such a way that the diffracted partial light beams being reflected back from different locations intersect each other prior to impinging on the first scanning grating 314.1, 314.2 in the scanning beam path.

It is furthermore provided in this variation to again arrange a ridge prism 318 in the scanning unit 310 for providing the retro-reflector functionality instead of employing the embodiment as previously described. The same as in the example in FIGS. 2a to 2e, the ridge 318.1 of the ridge prism 318 is arranged parallel in regard to the measuring direction x. The ridge prism 318 also has two bores 318.2, 318.3, or optically non-effective through-openings, through which the illuminating light beam can be propagated to the reflection scale graduation 320, or to the detector elements 316.1, 316.2, 316.3. In accordance with the representation of FIG. 5e, the various scanning gratings 314.1 to 314.4, as well as the splitting grating 314.6 and the combining grating 314.5, are arranged on the underside of the ridge prism 318.

Otherwise, in this variation the scanning beam path extends in principle analog to the scanning beam paths of the third embodiment.

This second modification of the third embodiment is particularly advantageous for very small graduation periods $TP_M$ on the part of the reflection scale representation. By the illumination of the measuring graduation which is slanted with respect to the measuring direction x, it is also possible to scan reflection scale representations whose graduation periods $TP_M$ are less than the wavelength lambda of the light source used. The theoretically minimal scannable graduation period $TP_M$ here corresponds to $\lambda/2$.

In conclusion, some more dimensioning rules will be briefly explained in regard to this variation.

If in the above described equation (2.1) $TP_M$ is replaced by $-TP_M$, $TP_{AG1}$ by $-TP_{AG1}$, as well as $TP_{AG2}$ by $-TP_{AG2}$, the following applies to the different graduations:

$$1/TP_{AG1} = 1/TP_{AG2} = 1/TP_M - 1/TP_{VG} \quad \text{Eq. 4.1}$$

wherein:
$TP_M$=graduation period of the measurement graduation
$TP_{VG}$=graduation period of the combining grating.

So that a beam separation of those light beams becomes possible, which on the one hand pass through the splitting grating 314.6, and on the other hand extend back from the reflection scale graduation 320 in the direction of the scanning plate, the following condition (4.2) must be observed:

$$TP_{AG2} > 2*TP_M \quad \text{Eq. 4.2}$$

Suitably selected values are, for example, $TP_M$=0.5 μm, $TP_{AG1}$=$TP_{AG2}$=1.3 μm with a wavelength $\lambda$=670 nm.

Third Embodiment

A third embodiment of the position measuring arrangement in accordance with the present invention is represented in FIGS. 6a to 6d. Again, the representation corresponds to those of the previously explained in FIGS. 1a to 1d, 3a to 3d and 4a to 4d. Essentially only the definitive differences from these examples will be considered.

Figure 6A:
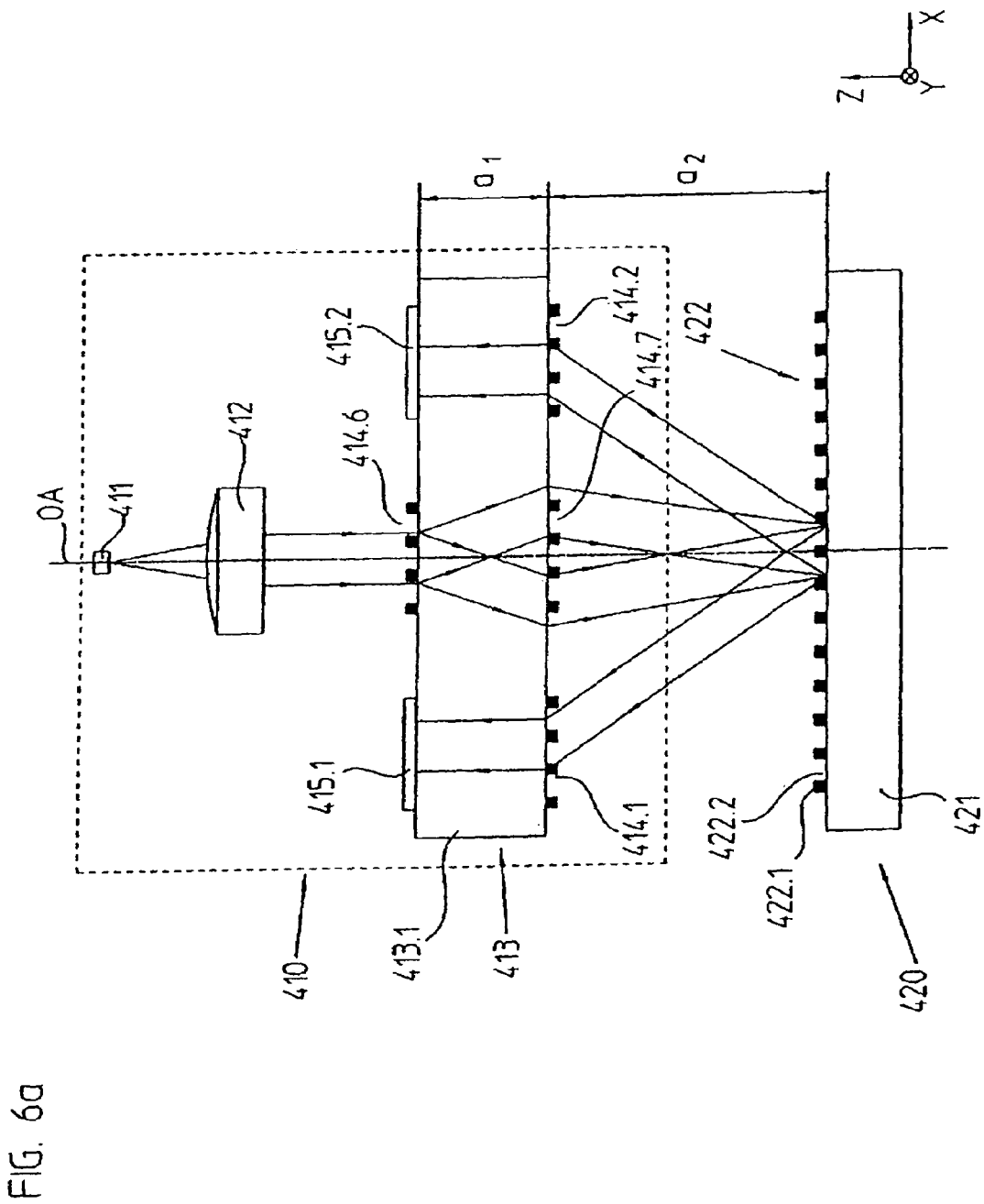
FIG. 6a represents a first portion of the scanning beam path of a third embodiment of a position measuring arrangement in accordance with the present invention.
Figure 6B:
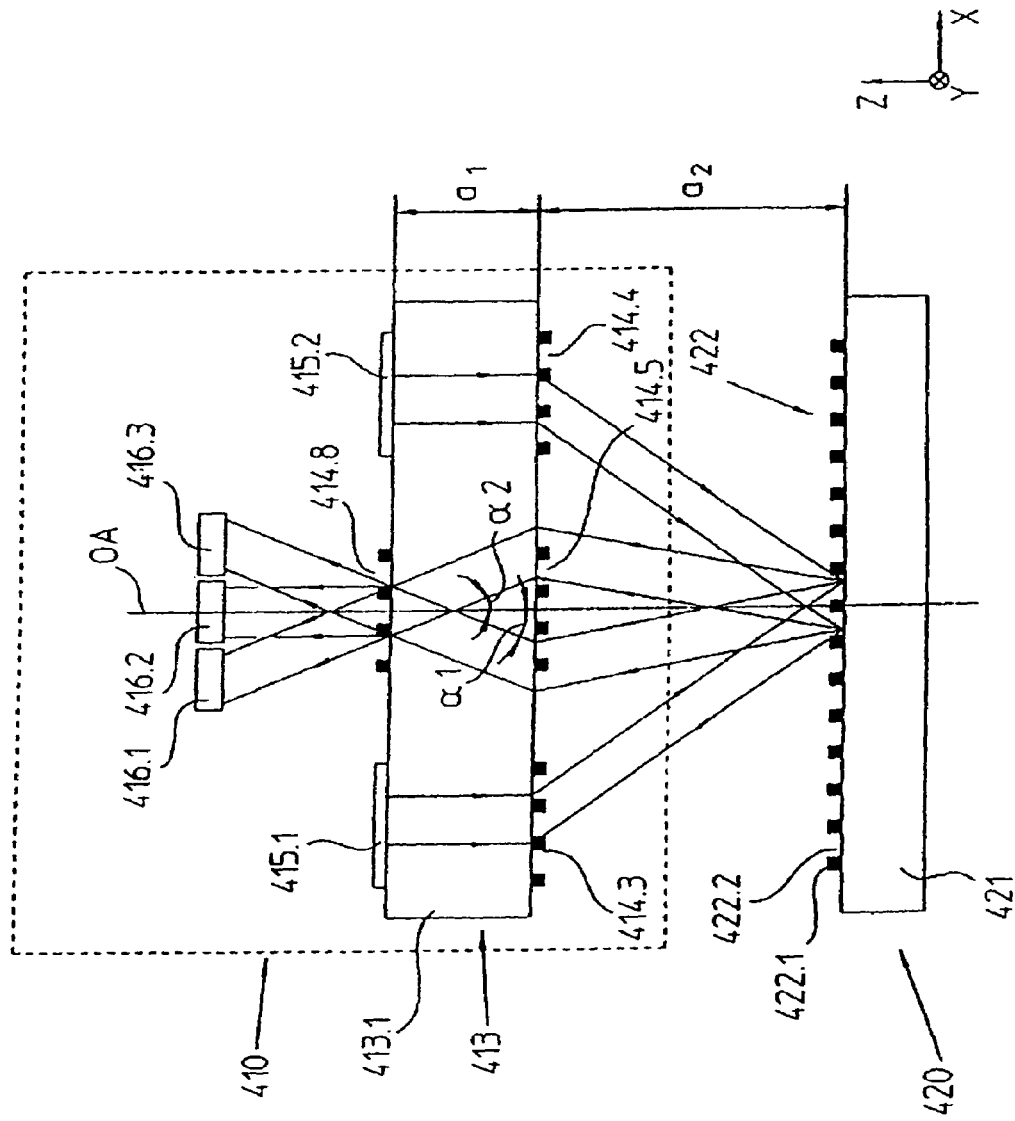
FIG. 6b represents a second portion of the scanning beam path of the position measuring arrangement of FIG. 6a in accordance with the present invention.
Figure 6D:
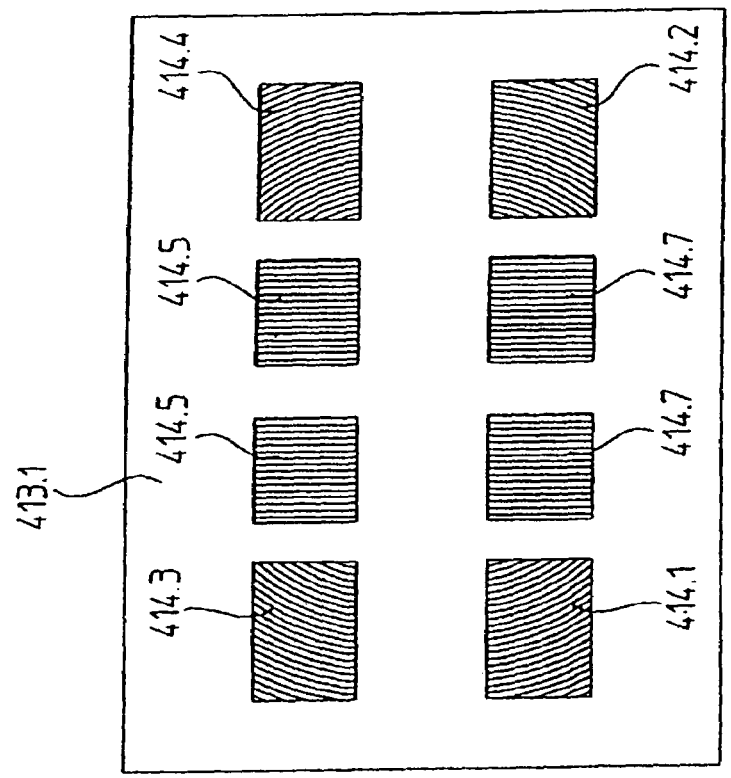
FIGS. 6c and 6d, respectively, show a plan view of a top and underside of a sixth embodiment of a scanning plate to be used with the position measuring arrangement of FIG. 6a in accordance with the present invention.

Thus, it has now been provided that the light beam, which is parallel after passing through the optical collimation device 412, impinges on a splitting grating 414.6 on the top of the scanning plate 413 and is split there into two partial light beams. Subsequently, both partial light beams reach an auxiliary splitting grating 414.7 on the underside of the scanning plate 413. By this auxiliary splitting grating 414.7 it is assured that the two split partial light beams impinge at the same impact location on the reflection scale representation 420. As can be seen in the view of FIG. 6d, the auxiliary splitting grating 414.7 can also include two separate grating structures.

Figure 6C:
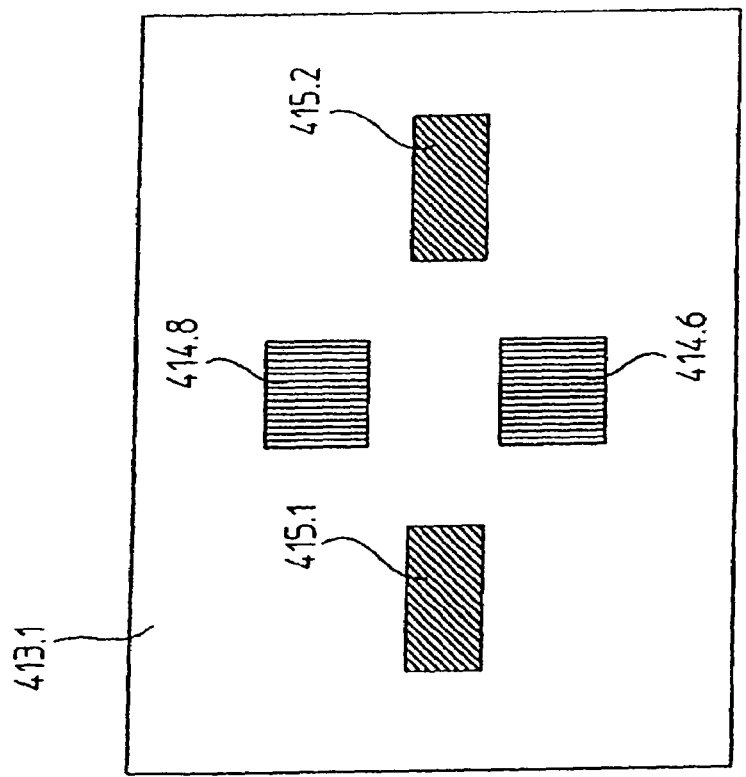
Figure 7A:
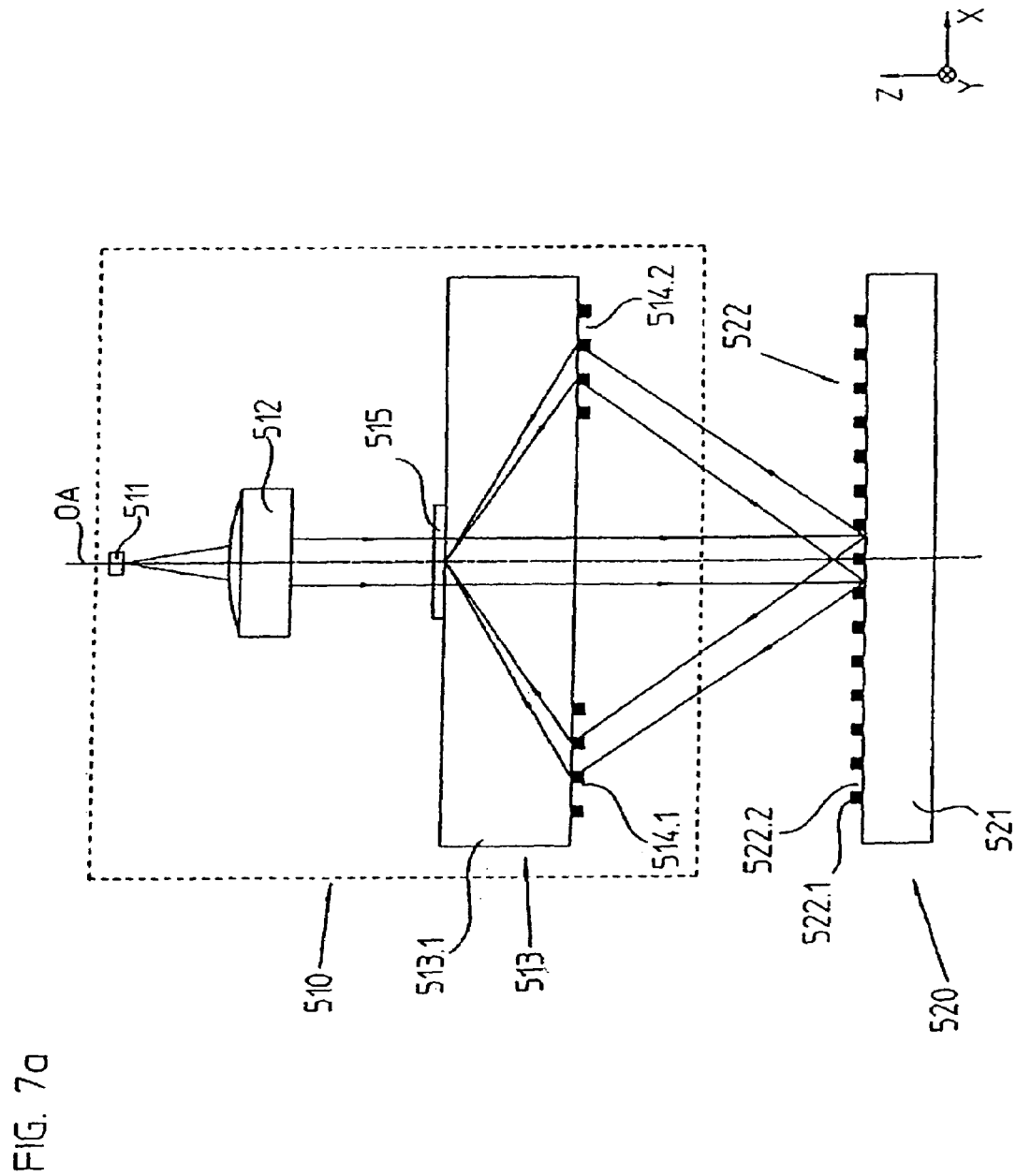
FIG. 7a represents a first portion of the scanning beam path of a fourth embodiment of apposition measuring arrangement in accordance with the present invention.
Figure 7B:
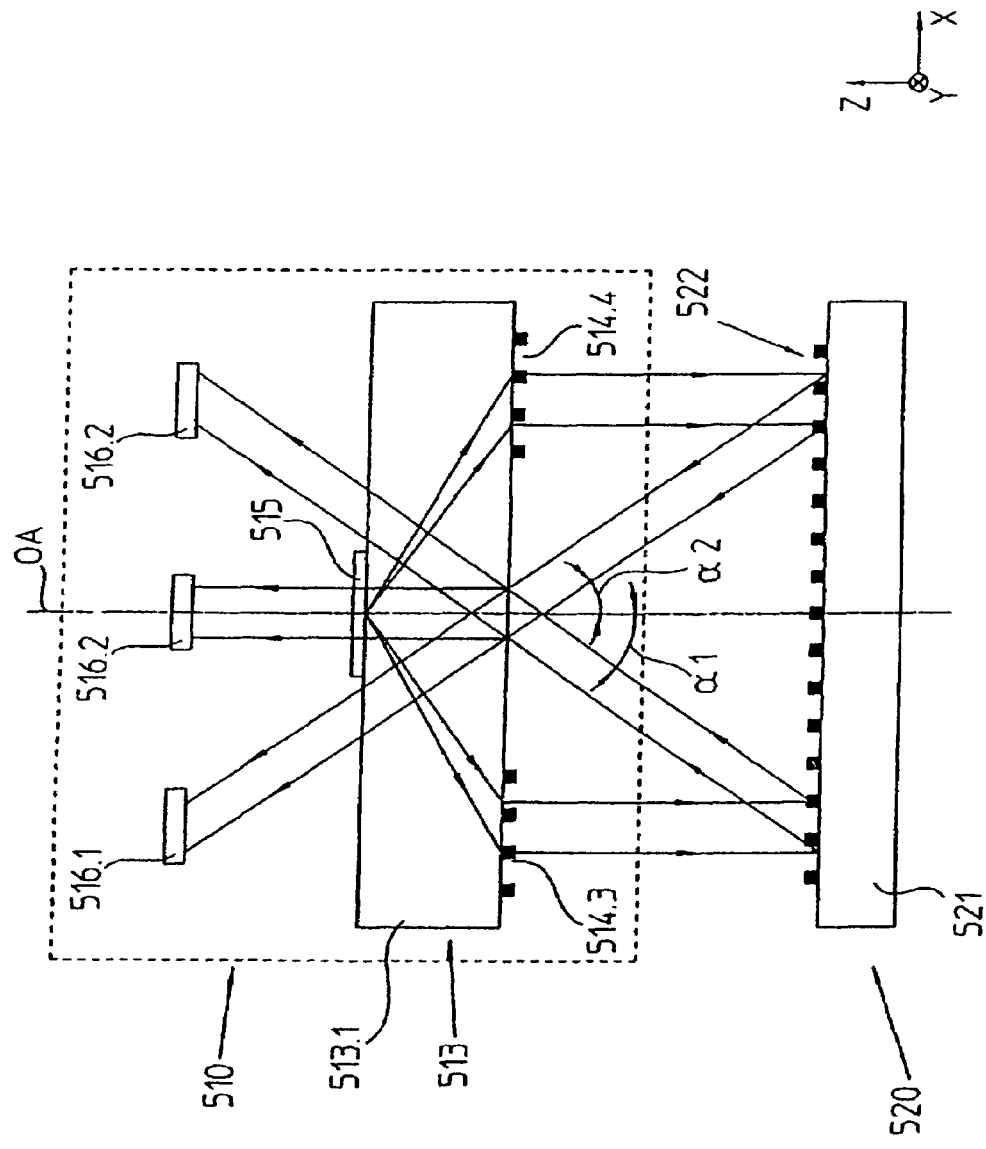
FIG. 7b represents a second portion of the scanning beam path of the position measuring arrangement of FIG. 7a in accordance with the present invention.
Figure 7D:
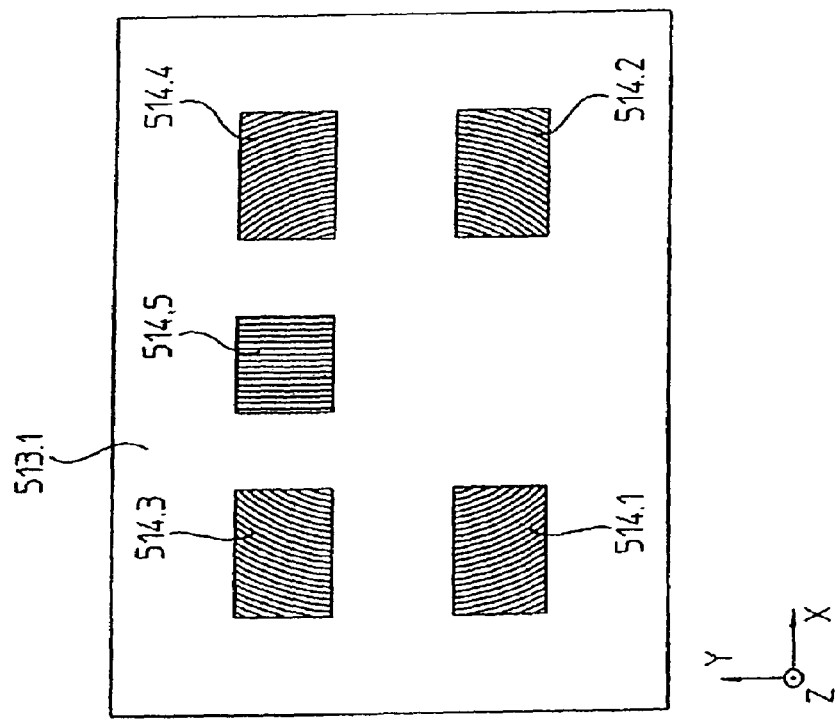
FIGS. 7c and 7d, respectively, show a plan view of a top and underside of a seventh embodiment of a scanning plate to be used with the position measuring arrangement of FIG. 7a in accordance with the present invention.
Figure 7C:
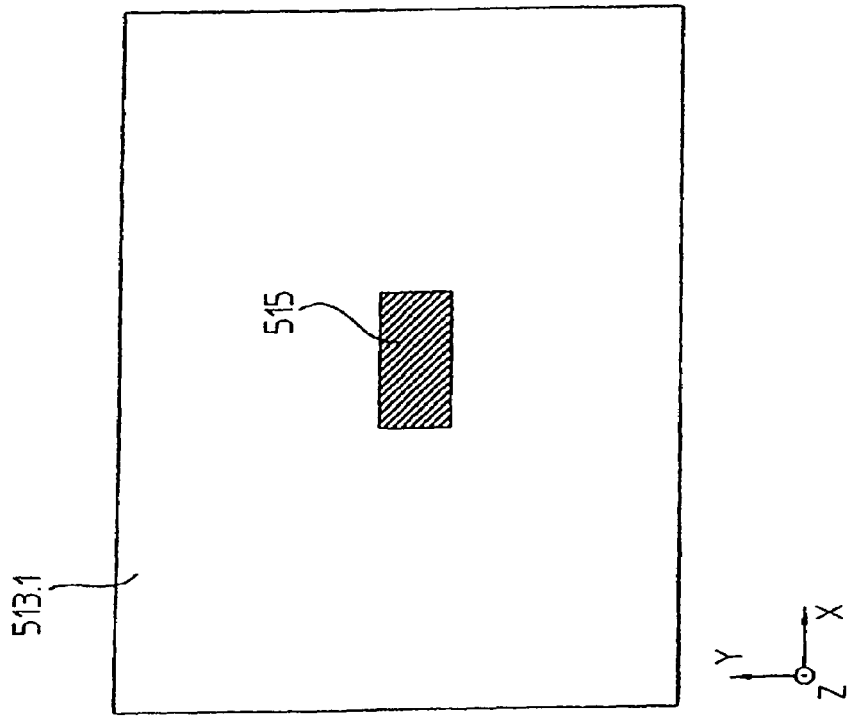
Figure 8A:
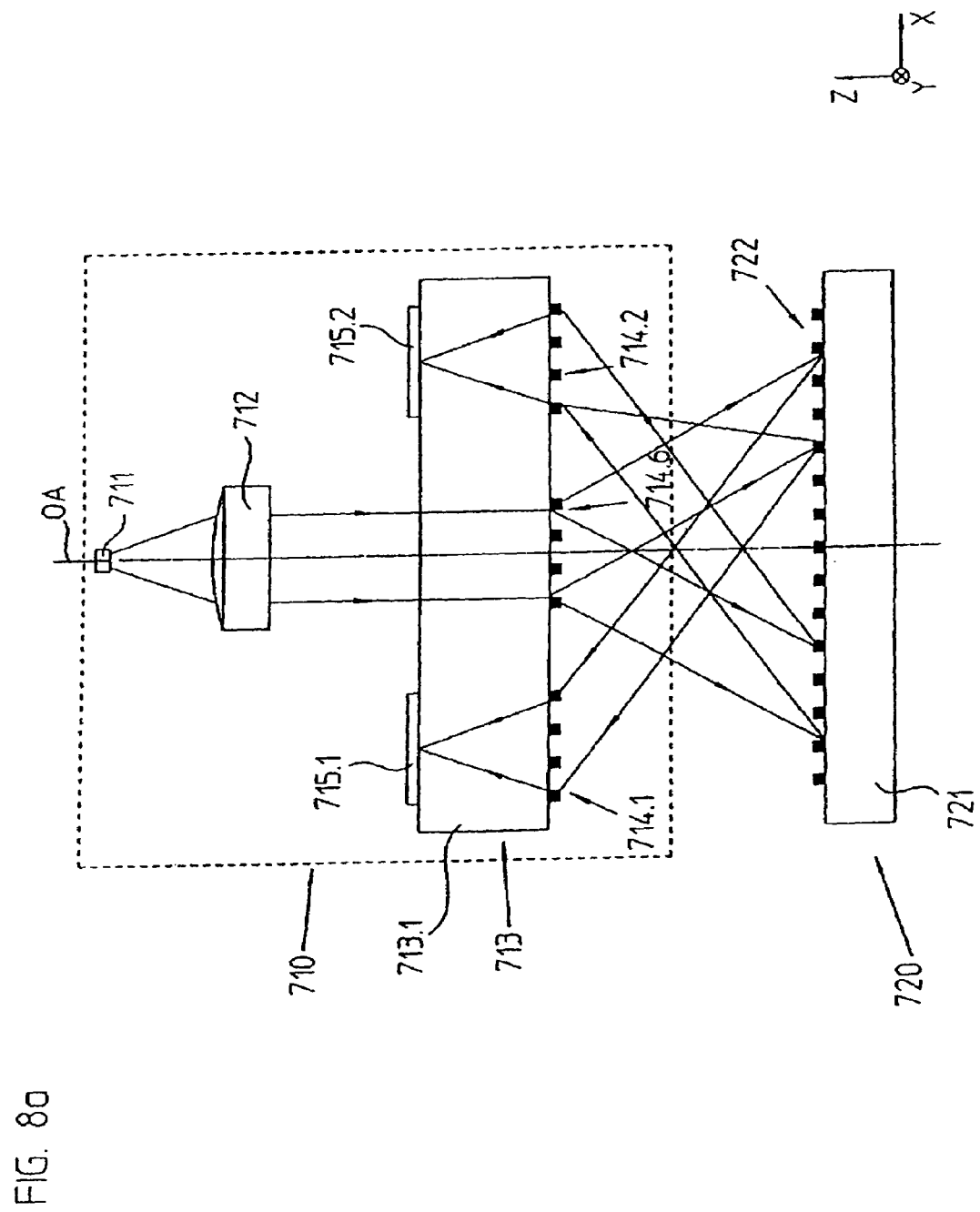
FIG. 8a represents a first portion of the scanning beam path of a fifth embodiment of a position measuring arrangement in accordance with the present invention.
Figure 8B:
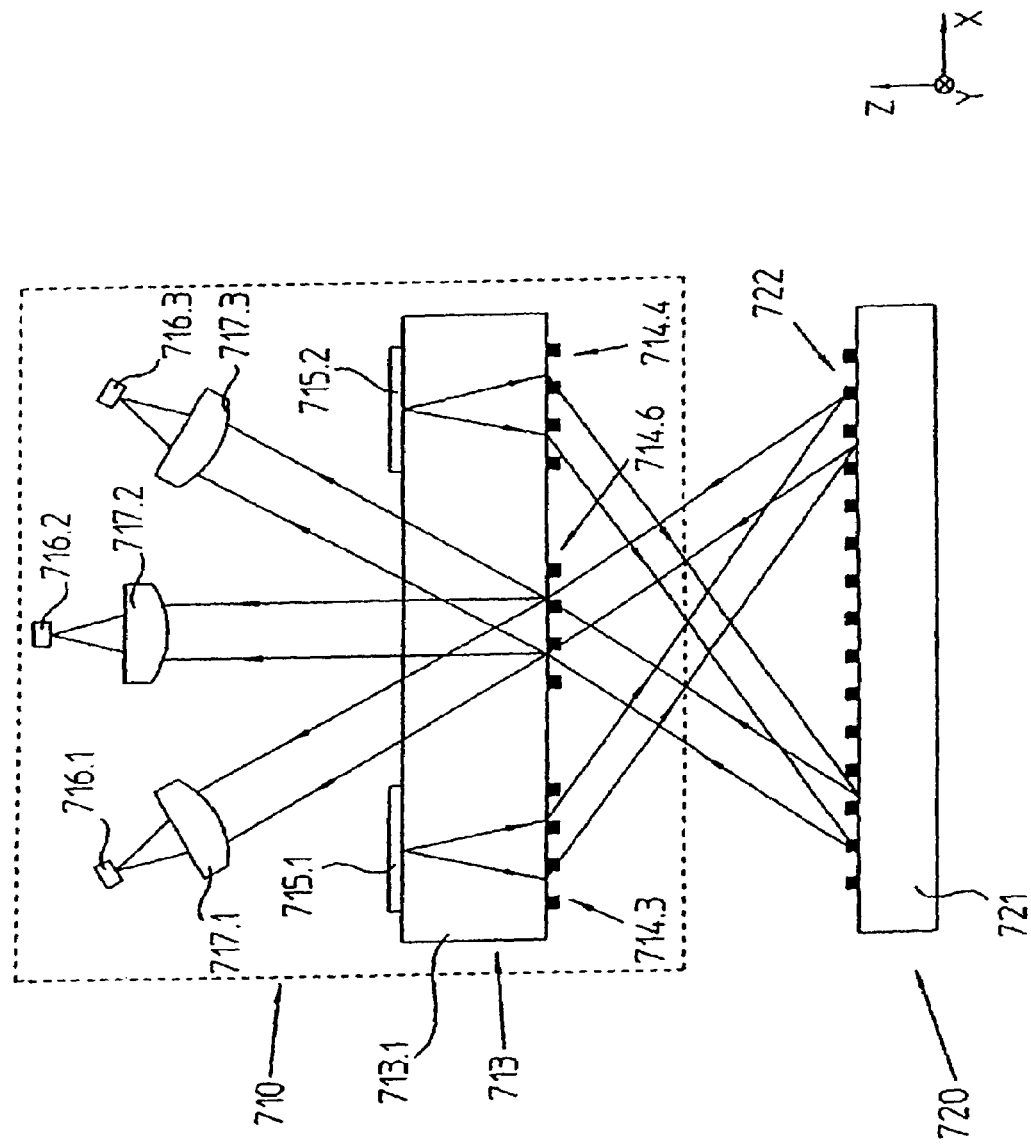
FIG. 8b represents a second portion of the scanning beam path of the position measuring arrangement of FIG. 8a in accordance with the present invention.

Following the initial back reflection at the reflection scale graduation 420, the partial light beams first arrive at the scanning gratings 414.1, 414.2, the same as in the previous examples, are then again deflected by the reflector elements 415.1, 415.2 in the direction toward the reflection scale graduation and pass through the scanning gratings 414.3, 414.4 before they impinge a second time on the reflection scale graduation 420 at the same location. From there, the back reflection in direction toward the scanning unit 410 takes place again. Partial light beams, which diverge at symmetrical angles, now impinge in the scanning unit on an auxiliary combining grating 414.5 on the underside of the scanning plate; the auxiliary combining grating 414.5 can also include two separate grating structures, as can be seen in FIG. 6c. The auxiliary combining grating 414.5 assures that the partial light beams, coming together again at symmetrical angles $\alpha1$=$\alpha2$, impinge on the combining grating 414.8 before three pairs of interfering partial light beams are propagated in the direction toward the detector elements 416.1, 416.2, 416.3.

It is therefore assured in this example that the partial light beams, initially split by the splitting grating 414.6, impinge on the same location of the reflection scale graduation 410, or the measuring graduation 422. This is important in particular in case of local dirt accumulations, which then will affect all signal portions equally.

The following conditions, which must be met, result in regard to the dimensioning of the different gratings in this example:

$$a_1 * \text{Tan}(\text{ArcSin}(\lambda/(n_A * TP_{AG}))) = a_2 * \text{Tan}(\text{ArcSin}(\lambda/(TP_{AHG}))) \quad \text{Eq. 5.1}$$

wherein:
a1=the distance between the grating levels of the scanning plate
a2=the scanning distance between the reflection scale graduation and the scanning unit
$n_a$=the diffraction index of the scanning plate
$TP_{AG}$=the graduation period of the splitting grating 414.6
$TP_{AHG}$=the graduation period of the auxiliary splitting grating 414.7.

Moreover, in the case of this exemplary embodiment the following must apply:

$$1/TP_{AG1} = 1/TP_M + 1/TP_{AHG} + 1/TP_{AG} \quad \text{Eq. 5.2}$$

$$TP_{VG} = TP_{AG} \quad \text{Eq. 5.3a}$$

$$TP_{AHG} = TP_{VHG} \quad \text{Eq. 5.3b}$$

wherein:
$TP_{AG}$=graduation period of the splitting grating
$TP_{AHG}$=graduation period of the auxiliary splitting grating
$TP_{AG1}$=graduation period of the scanning grating 414.2
$TP_M$=graduation period of the reflection scale graduation
$TP_{VG}$=graduation period of the combining grating
$TP_{VHG}$=graduation period of the auxiliary combining grating.

If in this example the above mentioned dimensioning rules are met, the neutral axis of rotation of this system is located in the plane of the reflection scale graduation 420.

The total efficiency of a position measuring arrangement based on this example can be improved by the employment of blazed gratings for the auxiliary splitting grating 414.7 and the auxiliary combining grating 414.5, which have been optimized to the efficiency of the employed first order of diffraction. The same effect can also be obtained by illumination slanted in the y-direction. In that case, the auxiliary splitting grating 414.7 and the auxiliary combining grating 414.5 are designed in such a way that the reflection scale graduation 420 is illuminated perpendicularly in the y-direction.

Fourth Embodiment

A fourth exemplary embodiment of the position measuring arrangement in accordance with the present invention will be explained in what follows by FIGS. 7a to 7d.

In the number of gratings employed in the scanning beam path between the light source 511 and the detector elements 516.1 to 516.3, this variation corresponds to that in FIGS. 1a to 1d, i.e. to the first explained exemplary embodiment. However, in contrast thereto the scanning gratings 514.1 to 514.4 are designed in such a way that point-focusing of the partial light beams coming from the reflection scale graduation 520 onto the single provided reflector element 515 on the top of the scanning plate 513 takes place. Otherwise, the scanning beam path corresponds in principle to the one in the first example.

Regarding the graduation periods of the various gratings in the scanning beam path, the following condition must be met in this example:

$$TP_{VG} = TP_M \quad \text{Eq. 6}$$

wherein:

$TP_{VG}$=graduation period of the combining grating
$TP_M$=graduation period of the reflection scale graduation.

Again, the scanning gratings 514.1, 514.2 represent a deflection grating combined with a diffractive lens. In this embodiment, this diffractive lens is designed as a cylinder-symmetrical lens, which is centered on the optical axis OA of the optical scanning device. It focuses the partial light beams onto the reflector element 515 on the top of the scanning plate 513. The superimposed deflection grating deflects with a graduation period $TP_{AG1} = TP_M$.

The scanning gratings 514.3, 514.4 are exclusively embodied as cylinder-symmetrical diffractive lenses, centered on the optical axis OA of the optical scanning device. They do not exert any additionally superimposed deflecting effect ($1/TP_{AG}2=0$), but collimate the light beams focused on the top of the scanning plate 513.

When meeting these conditions, the neutral axis of rotation is located in the present example approximately at the level of the scanning gratings above the reflection scale graduation.

Fifth Embodiment

A fifth embodiment of the position measuring arrangement in accordance with the present invention is represented in FIGS. 8a to 8d. Again, the representation corresponds to those of the previously explained variations. Essentially only the definitive differences from the previous examples will be considered in what follows.

The represented fifth embodiment largely corresponds to the previously explained third embodiment, which had been explained by FIGS. 5a to 5d. In contrast to the third embodiment, the ridge prism provided as the retro-reflector element was replaced by combined deflection/lens elements 714.1 to 714.4 which, have normal lens elements in place of cylinder lens elements. The incident partial light beams therefore are focused in the line direction y of the reference scale graduation 720, as well as in the measuring direction x, on the reflector elements 715.1, 715.2, or are again combined after reflection. This causes a complete directional reversal of the partial incident light beams. This complete directional reversal has the result that, following the second reflection at the reflection scale graduation 720, the beam directions of the two partial light beams are no longer affected by possible tilting of the reflection scale graduation 720. This can be advantageously used if the partial light beams emerging downstream of the combining grating are focused by lenses 717.1, 717.2, 717.3 on smaller detector elements 716.1, 716.2, 716.3. The impact point on the detector elements 716.1, 716.2, 716.3 remains stable, even in case of a possible tilting of the reflection scale graduation 720. It is therefore possible to employ particularly small, and therefore rapidly reacting detector elements 716.1, 716.2, 716.3, it is furthermore also possible to employ optical fibers for detection.

Besides the explained examples, further embodiment options of course also result within the framework of the present invention.

Thus, for example, it is possible to employ different light sources, such as LEDs or lasers of a transversal mono-mode or multi-mode structure. Transversal multi-mode, vertically-emitting laser diodes (VCSEL) or LEDs are particularly advantageous because by their use it is possible to avoid an interfering speckle creation. Since in all embodiments the impact locations of the two impinging light beams advantageously meet at the combining grating, a high signal modulation results also with a transversal multi-mode light source.

In place of the combining gratings and photo elements for the individually outgoing resultant orders of diffraction, it is also possible to employ so-called structured detector arrangements. Structured detector arrangements are known, for example, from DE 100 22 619 A1 and U.S. Pat. No. 7,214,928, the entire contents of which are incorporated herein by reference, and include parallel arranged, strip-shaped photodetectors, wherewith respectively every Nth photo-detector is electrically connected. Such a structured detector arrangement provides N signals, which are phase-shifted by 360°/N with respect to each other. N preferably is 3 or 4.

The partial light beams, which in all exemplary embodiments converge at an angle, interfere at the location of the combining grating and form a strip system, whose strip period corresponds to half the graduation period of the combining grating. By a suitable selection of the graduation periods $TP_M$, $TP_{AG1}$, $TP_{AG2}$ it is possible to set the strip pattern so large, that it can be detected by a structured detector arrangement. For this purpose, the strip pattern period should advantageously have values of 40 μm or more. The structured detector arrangement is preferably placed in the intersection point of the two converging partial light beams. In this case the grating-shaped photo element structure represents the combining grating. By an appropriate selection of the graduation periods $TP_M$, $TP_{AG1}$, $TP_{AG2}$ it is possible to advantageously place the intersection point in a plane above the scanning plate.

In a further detector variation, the combining grating can also be embodied as a location-dependent deflection grating. Such a location-dependent deflection grating is known from U.S. Pat. No. 5,497,226, the entire contents of which are incorporated herein by reference. The strip pattern system formed by the interference of the two partial light beams at the location of the combining grating, or location-dependent deflection grating, interacts with the location-dependent deflection grating which has the same graduation period as the strip pattern system. The location-dependent deflection grating has several strip-shaped partial areas in each graduation period. In turn, each one of these partial areas has a sub-grating with a lower graduation period. The individual partial areas differ in their graduation periods and/or the orientation of the sub-gratings with respect to the measuring direction x. They deflect both impinging partial light beams to a deflector element assigned to the respective partial area. As a function of the position of the maxima of the strip pattern system relative to the individual partial areas of the location-dependent deflection grating, the individual partial areas are illuminated at different intensities, so that the associated detectors emit a modulated signal.

This embodiment can be advantageously employed in connection with large graduation periods $TP_{VG}$ of the combining grating, since in that case the angular splitting of the outgoing partial light beams is small and these therefore cannot be separately guided onto photo elements.

With small graduation periods of the reflection scale graduation, the diffraction efficiency and phase-shifting effects of the latter can be a function of the polarization of the incident light beam. In order to avoid a negative effect on the signals because of such polarization dependencies, it is advantageous to exclusive employ linearly polarized light beams with a common polarization direction, which extend either parallel in relation to the line direction or parallel in relation to the measuring direction. For this purpose it is either possible to arrange the laser diode appropriately oriented, or to employ an appropriately aligned polarizer in the illumination beam path.

When using combined diffractive lenses and deflection elements, polarization states can occur, which can change over the beam cross section because of the curved grating strips. In order to avoid possible polarization-dependent signal distortions, it can therefore be furthermore advantageous to also insert a polarizer into the beam paths of both partial light beams respectively downstream of the last diffractive lens element passed. In this case the orientation of the polarizers should again advantageously be selected parallel in relation to the measuring direction or parallel in relation to the line direction of the scale.

In closing it should be mentioned in regard to alternative embodiments that the retro-reflector element of the above mentioned fifth embodiment (FIGS. 8a to 8d) with focusing in the measuring direction x as well as in the line direction y of the scale graduation can, of course, also be combined with other exemplary embodiments, etc.

The foregoing description is provided to illustrate the invention, and is not to be construed as a limitation. Numerous additions, substitutions and other changes can be made to the invention without departing from its scope as set forth in the appended claims.

We claim:

1. A position measuring arrangement for detecting a relative position of a scanning unit and a reflection scale graduation which is moved in relation to said scanning unit in a measuring direction, the position measuring arrangement comprising:
   a reflection scale graduation; and
   a scanning unit comprising a plurality of optical elements, said plurality of optical elements comprising:
      a combining grating;
      a retro-reflector element;
      a scanning grating; and
      a plurality of detector elements,
   wherein said plurality of optical elements are arranged so that:
      light beams and/or partial light beams of a scanning beam path act on said reflection scale graduation at least twice, and in the course of this a plane is defined on the one hand by incident light beams and/or partial light beams that impinge on said reflection scale graduation, and on the other hand by reflected partial light beams that reflect off of said reflection scale graduation, wherein said plane is oriented perpendicularly to a graduation plane defined by said reflection scale graduation,
      a directional reversal of said incident partial light beams impinging on said reflection scale graduation perpendicularly with respect to said measuring direction takes place by said retro-reflector element; and
      a pair of partial light beams impinges in a non-parallel manner on said combining grating, and said combining grating brings said partial light beams impinging on said combining grating to interference, so that phase-shifted signals are detected by said plurality of detector elements.

2. The position measuring arrangement in accordance with claim 1, wherein said pair of partial light beams impinging on said combining grating do so symmetrically at identical angles in relation to an optical axis.

3. The position measuring arrangement in accordance with claim 1, wherein said combining grating comprises a transmission grating and has a graduation period ($TP_{VG}$) such that it assures that a deflection of said pair of partial light beams impinging on said combining grating results in a plurality of co-linearly exiting orders of diffraction taking place, which act on downstream arranged ones of said plurality of detector elements.

4. The position measuring arrangement in accordance with claim 3, wherein said combining grating has a structure so that a deflection of said pair of partial light beams impinging on said combining grating takes place in such a way that one of said plurality of co-linearly exiting orders of diffraction is propagated perpendicularly with respect to said graduation plane.

5. The position measuring arrangement in accordance with claim 4, wherein said combining grating comprises a phase grating, and has a strip thickness and a strip width that are dimensioned in such a way that three signals, phase-shifted by 120°, are detected by said downstream arranged ones of said plurality of detector elements.

6. The position measuring arrangement in accordance with claim 1, wherein said combining grating and said plurality of detector elements are embodied as a structured detector arrangement.

7. The position measuring arrangement in accordance with claim 1, wherein said combining grating comprises a location-dependent deflection grating.

8. The position measuring arrangement in accordance with claim 1, wherein said scanning unit comprises a plurality of scanning gratings, wherein said plurality of scanning gratings and said combining grating are arranged mirror-symmetrically, wherein a plane of symmetry is oriented perpendicularly with respect to said measuring direction and parallel with respect to an optical axis.

9. The position measuring arrangement in accordance with claim 1, wherein said scanning unit further comprises a reflector element comprising a ridge prism whose ridge is oriented parallel with respect to said measuring direction.

10. The position measuring arrangement in accordance with claim 1, wherein said retro-reflector element comprises several combined deflection/lens elements, as well as at least one flat reflector element, and a focal plane of the lens elements is located in a plane of said at least one flat reflector element.

11. The position measuring arrangement in accordance with claim 10, wherein said combined lens elements comprise diffractive lens elements, said deflection elements comprise scanning gratings, and said lens elements and deflection elements define combined, diffractive grating-lens elements.

12. The position measuring arrangement in accordance with claim 10, wherein said lens elements comprise diffractive lens elements in the form of cylinder lenses, which have a focusing effect in a line direction of said reflection scale graduation that is perpendicular to said measuring direction.

13. The position measuring arrangement in accordance with claim 10, wherein said lens elements comprise diffractive lens elements in the form of cylinder-symmetrical lens elements, which have a focusing effect in the measuring direction and in a line direction of said reflection scale graduation that is perpendicular to said measuring direction.

14. The position measuring arrangement in accordance with claim 10, wherein said retro-reflector element comprises a plane-parallel support substrate, wherein said substrate comprises:
   a first side facing said reflection scale graduation that includes several gratings arranged thereon; and
   a second side facing away from said reflection scale graduation that includes said at least one flat reflector element arranged thereon.

15. The position measuring arrangement in accordance with claim 1, wherein impact locations of said pair of partial light beams impinging on said combining grating meet one another at said combining grating.

16. The position measuring arrangement in accordance with claim 1, wherein said retro-reflector element comprises a monolithic unit on a support element.

17. The position measuring arrangement in accordance with claim 1, wherein said scanning unit comprises a plurality of scanning gratings, wherein said plurality of scanning gratings and said combining grating are arranged mirror-symmetrically, wherein a plane of symmetry is oriented parallel with respect to said measuring direction and parallel with respect to an optical axis.

18. The position measuring arrangement in accordance with claim 1, wherein said scanning unit further comprises:
   a light source that emits light beams;
   an optical collimation device that receives said emitted light beams and forms collimated light beams;
   wherein said scanning unit is structured so that:
      said collimated light beams impinge for a first time on said reflection scale graduation, where splitting into two partial light beams corresponding to two different orders of diffraction occurs and said two partial light beams are reflected back to said scanning unit;
      said two partial light beams reflected back undergo a back reflection in said scanning unit via said retro-reflector element in a direction of said reflection scale graduation, wherein each of said two partial light beams reflected back passes twice through said scanning grating;
      said two partial light beams passing twice through said scanning grating impinging a second time on said reflection scale graduation and undergo another diffraction and back reflection in a direction toward said scanning unit; and
      in said scanning unit said two-partial light beams undergoing another diffraction and back reflection impinge at symmetrical angles in relation to an optical axis at a same location on said combining grating.

19. The position measuring arrangement in accordance with claim 1, wherein said scanning unit further comprises:
   a light source that emits light beams;
   an optical collimation device that receives said emitted light beams and forms collimated light beams;
   a splitting grating;
   wherein said scanning unit is structured so that:
      said collimated light beams impinge on said splitting grating and are split into two partial light beams corresponding to two different orders of diffraction and said two partial light beams are propagated in a direction toward said reflection scale graduation;
      said two propagated partial light beams impinge for a first time on different locations on said reflection scale graduation, where they are split into respective sets of partial light beams which correspond to different orders of diffraction and are reflected back to said scanning unit;
      said respective sets of partial light beams reflected back undergo a back reflection in said scanning unit via said retro-reflector element in a direction toward said reflection scale graduation, wherein each of said respective sets of partial light beams reflected back passes twice through said scanning grating;
      said respective sets of partial light beams passing twice through said scanning grating impinging a second time at different locations on said reflection scale graduation and undergo another diffraction and back reflection in a direction toward said scanning unit; and
      in said scanning unit said respective sets of partial light beams undergoing another diffraction and back reflection impinge at symmetrical angles in relation to an optical axis at a same location on said combining grating.

20. The position measuring arrangement in accordance with claim 19, wherein said scanning grating comprises a Fresnel cylinder lens, whose focal line is located in a plane of said reflector element, and wherein a graduation period ($TP_{AG0}$) of said splitting grating is selected to be identical to both a graduation period ($TP_{AG1}$) of said combining grating and a graduation period ($TP_M$) of said reflection scale graduation.

21. The position measuring arrangement in accordance with claim 19, wherein a graduation period ($TP_M$) of said reflection scale graduation is selected to be such that said respective sets of partial light beams reflected back cross one another prior to their first impact on said scanning grating.

22. The position measuring arrangement in accordance with claim 21, wherein said graduation period ($TP_M$) of said reflection scale graduation is selected to be less than a wavelength ($\lambda$) of said light beams emitted by said light source.

23. The position measuring arrangement in accordance with claim 20, wherein said retro-reflector element comprises a combined deflection/lens element.

24. The position measuring arrangement in accordance with claim 1, wherein said scanning unit further comprises:
   a light source that emits light beams;
   an optical collimation device that receives said emitted light beams and forms collimated light beams;
   a splitting grating;
   an auxiliary splitting grating;
   an auxiliary combining grating;
   wherein said scanning unit is structured so that:
      said collimated light beams impinge on said splitting grating and are split into two partial light beams corresponding to two different orders of diffraction and said two partial light beams are propagated in a direction toward said auxiliary splitting grating;
      said two partial light beams then reach said auxiliary splitting grating which deflects at least a part of said two partial light beams in such a way that said two partial light beams propagate in a direction toward said reflection scale graduation and impinge on said reflection scale graduation at a same location;
      said two propagated partial light beams impinging on said reflection scale graduation are split into respective sets of partial light beams which correspond to different orders of diffraction and are reflected back to said scanning unit;
      said respective sets of partial light beams reflected back undergo a back reflection in said scanning unit via said retro-reflector element, wherein each of said respective sets of partial light beams reflected back passes twice through said scanning grating;

said respective sets of partial light beams passing twice through said scanning grating impinge a second time at a same location on said reflection scale graduation and undergo another diffraction and back reflection in a direction toward said scanning unit; and in said scanning unit said respective sets of partial light beams undergoing another diffraction and back reflection impinge at different locations on said auxiliary combining grating, where another diffraction and splitting takes place, so that at least two further propagated partial light beams impinge at symmetrical angles in regard to an optical axis at a same location on said combining grating.

25. The position measuring arrangement in accordance with claim 1, wherein said scanning unit further comprises:
a light source that emits light beams;
an optical collimation device that receives said emitted light beams and forms collimated light beams;
a flat reflector element;
wherein said scanning unit is structured so that:
said collimated light beams impinge for a first time on said reflection scale graduation, wherein said reflection scale graduation comprises an incident light refraction grating and where splitting into two partial light beams corresponding to two different orders of diffraction occurs and said two partial light beams are reflected back to said scanning unit;

said two partial light beams reflected back undergo a back reflection in said scanning unit via said retro-reflector element in a direction toward said reflection scale graduation, wherein each of said two partial light beams reflected back passes twice through said scanning grating, and in the course of a first passage through said scanning grating a point focusing of said two partial light beams onto a same impact location on said flat reflector element results;

said two partial light beams passing twice through said scanning grating impinging a second time on said reflection scale graduation and undergo another diffraction and back reflection in a direction toward said scanning unit; and in said scanning unit said two partial light beams undergoing another diffraction and back reflection impinge at symmetrical angles in relation to an optical axis at a same location on said combining grating.

* * * * *